(12) United States Patent
Zang et al.

(10) Patent No.: US 6,711,324 B1
(45) Date of Patent: Mar. 23, 2004

(54) SOFTWARE MODEL FOR OPTICAL COMMUNICATION NETWORKS

(75) Inventors: Hui Zang, Burlingame, CA (US); Hongyue Zhu, Davis, CA (US)

(73) Assignee: Sprint Communications Company, L.P., Overland Park, KS (US)

( * ) Notice: Subject to any disclaimer, the term of this patent is extended or adjusted under 35 U.S.C. 154(b) by 21 days.

(21) Appl. No.: 10/193,732

(22) Filed: Jul. 11, 2002

(51) Int. Cl.$^7$ .............................. G02B 6/00; G02B 6/28
(52) U.S. Cl. ......................................... 385/24; 398/115
(58) Field of Search ........................... 385/24; 398/115, 398/118, 130

(56) References Cited

U.S. PATENT DOCUMENTS

| | | | | |
|---|---|---|---|---|
| 2002/0109879 A1 | * | 8/2002 | Wing So | 359/118 |
| 2002/0165962 A1 | * | 11/2002 | Alvarez et al. | 709/226 |
| 2002/0176131 A1 | * | 11/2002 | Walters et al. | 359/118 |
| 2002/0186433 A1 | * | 12/2002 | Mishra | 359/128 |
| 2003/0023709 A1 | * | 1/2003 | Alvarez et al. | 709/223 |
| 2003/0025526 A1 | * | 2/2003 | Tamura et al. | 326/56 |
| 2003/0099018 A1 | * | 5/2003 | Singh et al. | 359/152 |

OTHER PUBLICATIONS

Mukherjee, Biswanath, "Optical Communication Networks," Department of Computer Science, University of California, Davis McGraw–Hill, 1997.

Zhu, Keyao and Mukherjee, Biswanath, "A Review of Traffic Grooming in WDM Optical Networks: Architectures and Challenges," Computer Science Department, University of California, Davis, Davis, CA 95616, pp. 1–17.

Modiano, Eytan; Lin, Philip J., "Traffic Grooming in WDM Networks," IEEE, Jul. 2001, pp. 124–129.

Zhu, Keyao and Mukherjee, Biswanath, "Traffic Grooming in an Optical WDM Mesh Network," IEEE, vol. 20, No. 1, Jan. 2002, pp. 122–133.

Chlamtac, Imrich, "Lightpath Communications: An Approach to High Bandwidth Optical WAN's" IEEE, vol. 40, No. 7, Jul. 1992, pp. 1171–1182.

Mukherjee, Biswanath, "Some Principles for Designing a Wide–Area WDM Optical Network," IEEE, vol. 4, No. 5, Oct. 1996, pp. 684–698.

Ramaswami, Rajiv, "Design of Logical Topologies for Wavelength–Routed Optical Networks," IEEE, vol. 14, No. 5, Jun. 1996.

Ganz, Aura; Wang, Xudong, "Efficient Algorithm for Virtual Topology Design in Multihop Lightwave Networks," IEEE, vol. 2, No. 3, Jun. 1994, pp. 217–225.

(List continued on next page.)

Primary Examiner—Akm Enayet Ullah

(57) ABSTRACT

A software model of the optical communication network is generated wherein the optical nodes are represented by access layers with access input ports and access output ports, lightpath layers with lightpath input ports and lightpath output ports and wavelength layers for each wavelength with wavelength input ports and wavelength output ports. The graphical links are then generated based on capabilities of the optical nodes. A path is determined for communications wherein the path is between the access output port of the source optical node and the access input port of the destination optical node through the lightpath layers and/or the wavelength layers based on the software model. A determination is then made of whether the path passes through any of the wavelength layers. A lightpath link is then generated for the graphical links of the path that pass through the wavelength layers and the wavelength is assigned to the lightpath.

56 Claims, 14 Drawing Sheets

OTHER PUBLICATIONS

Krishnaswamy, Rajesh M.; Sivarajan, Kumar No., "Design of Logical Topolgies: A Linear Formulation for Wavelength Routed Optical Networks with No Wavelength Changers," Electrical Communication Engineering Department, Indian Institute of Science, IEEE, pp. 919–927.

Gerstel, O.; Lin, P.; Sasaki, G., "Combined WDM and Sonet Network Design," IEEE 1999 pp. 734–743.

Zang, Hui, Jue, Jason P.; Mukherjee, Biswanath, "A Review of Routing and Wavelength Assignment Approaches for Wavelength–Routed Optical WDM Networks," Baltzer Science Publishers 2000, pp. 47–60.

Chlamtac, I., Ganz, A. and Karmi, G., "Lightnets: Topologies for High–Speed Optical Networks," IEEE vol. 11, No. 5/6, Many/Jun. 1993, pp. 951–961.

Chiu, Angela L. and Modiano, Eytan H., "Traffic Grooming Algorithms for Reducing Electronic Multiplexing Costs in WDM Ring Networks," IEEE, vol. 18, No. 1, Jan. 2000.

Wan, Peng–Jun; Calinescu, Gruia, Liu, Liwu, and Frieder, Ophir, "Grooming of Arbitrary Traffic in Sonet/WDM BLSRs," IEEE, vol. 18, No. 10, Oct. 2000, pp. 1995–2003.

Zhang, Xijun and Qiao, Chunming, "An Effective and Comprehensive Approach for Traffic Grooming and Wavelength Assignment in SONET/WDM Rings," vol. 8, No. 5, Oct. 2000.

Gerstel, Ornan, Ramaswami, Rajiv, and Sasaki, Galen H., "Cost–Effective Traffic Grooming in WDM Rings," IEEE, vol. 8, No. 5, Oct. 2000, pp. 618–630.

Simmons, Jane M.; Goldstein, Evan L.: and Saleh, Adel, A.M., "Quantifying the Benefit of Wavelength Add–Drop in WDM Rings with Distance–Independent and Dependent Traffic," IEEE, vol. 17, No. 1., Jan. 1999, pp. 48–57.

Dutta, Rudra and Rouskas, George N., "On Optimal Traffic Grooming in WDM Rings," IEEE, vol. 20, No. 1, Jan. 2002, pp. 110–121.

Wang, Jian; Cho, Wonhong; Vemuri, V. Rao; and Mukherjee, Biswanath, "Improved Approaches for Cost–Effective Traffic Grooming in WDM, Ring Networks; ILP Formulations and Single–Hop and Multihop Connections," IEEE, vol. 19, No. 11, Nov. 2001.

Wang, Jian, Mukherjee, Biswanath, "Interconnected WDM ring Networks: Strategies for Interconnection and Traffic Grooming," SPIE Optical Networks Magazine.

Berry, Randall and Modiano, Eytan, "Reducing Electronic Multiplexing Costs in SONET/WDM rings with Dynamically Changing Traffic," IEEE, vol. 18, No. 10, Oct. 2000, pp. 1961–1971.

Konda, V.R; and Chow, T.Y., "Algorithm for Traffic Grooming in Optical Networks To Minimize the Number of Transceivers," IEEE Workshop on High Performance Switching and Routing, (Dallas, TX), pp. 218–221, May 2001.

Brunato, Mauro and Battiti, Roberto, "A Multistart Randomized Greedy Algorithm for Traffic Grooming on Mesh Logical Topologies," Technical Report Universita di Trento, Dicembre 2001.

Thiagarajan, Sashisekaran and Somani, Arun K., "Capacity fairness of WDM Networks with Grooming Capabilities," Optical Networks Magazine, May/Jun. 2001, pp. 24–32.

Srinivasan, R.; and Somani, Arun K., "A Generalized Framework for Analyzing Time–Space Switched Optical Networks," IEEE, vol. 20, No. 1, Jan. 2002, pp. 202–215.

Zhu, Keyao and Mukherjee, Biswanath, "On–Line Approaches for Provisioning Connections of Different Bandwidth granularities in WDM Mesh Networks,"OFC/2001.

Cox, Jr., Louis Anthony and Sanchez (Ryan) Jennifer, Cost Savings from Optimized packing and grooming of Optical circuits: Mesh Versus ring Comparisons, optical Networks Magazine, May/Jun. 2001, pp. 72–90.

Lardies, Ana, Gupta, Rakesh and Patterson, Raymond A., "Traffic Grooming in a Multi–Layer Network," Optical Networks Magazine, May/Jun. 2001, pp. 91–99.

Subramaniam, Suresh, Azizoglu, Murat and Somani, Arun K., "All–Optical Networks with Sparse Wavelength Conversion," IEEE, vol. 4, No. 4, Aug. 1996, pp. 544–557.

Iness, Jason: and Mukherjee, Biswanath, "Sparse Wavelength Conversion in Wavelength–Routed WDM Optical Networks," Photonic Network Communications, 1:3, 183–205 (1999).

Yates, Jennifer, Lacey, Jonathan, Everitt, David and Summerfield, Mark, "Limited–Range Wavelength Translation in All–Optical Networks," IEEE 1996, pp. 954–961.

Ramaswami, Rajiv and Sasaki, Galen, "Multiwavelength Optical Networks with Limited Wavelength Conversion," IEEE, vol. 6, No. 6, Dec. 1998, pp. 744–754.

Venugopal, K. R; Shivakumar, M. and Kumar, P. Sreenivasa, "A Heuristic for Placement of Limited Range Wavelength Converters in All–Optical Networks," IEEE INFOCOM '99, vol. 2, (New York, NY), pp. 908–915, Mar. 1999.

Tripathi, Tushar and Sivarajan, Kumar N., "Computing Approximate Blocking Probabilities in Wavelength Routed All–Optical Networks with Limited–Range Wavelength Conversion," IEEE, vol. 18, No. 10, Oct. 2000, pp. 2123–2129.

Mukherjee, Biswanath, "WDM Optical Communication Networks: Progress and Challenges," IEEE, vol. 18, No. 10, Oct. 2000, pp. 1810–1824.

Ellinas, Georgios, Hailemariam, Gebreyesus and Stern, Thomas E., "Protection Cycles in Mesh WDM Networks," IEEE vol. 18, No. 10, Oct. 2000, pp. 1924–1937.

Ho, Pin–Han and Mouftah, H. T, "SLSP: A new path protection scheme for the optical Internet" Proc. OFC 2001, Tu01, 2001.

Gerstel, Ornan (Ori) and Ramaswami, Rajiv, "Optical Layer Survivability—An Implementation Perspective," IEEE, vol. 18, No. 10, Oct. 2000, pp. 1885–1899.

Ramamurthy, S. and Mukherjee, Biswanath, Survivable WDM Mesh Networks, Part I–Protection and Part II—Restoration, IEEE INFO–COM 1999, vol. 2, pp. 744–751, Mar. 1999, Part II in Proc. ICC 1999, vol. 3, pp. 2023–2030, Jun. 1999.

Thiagarajan, Sashisekaran and Somani, Arun K., "Traffic Grooming for Survivable WDM Mesh Networks," Dependable Computing & Networking Laboratory, Department of Electrical and Computer Engineering, Iowa State university, Ames, IA 50011.

* cited by examiner

SOFTWARE MODEL FOR OPTICAL COMMUNICATION NETWORKS

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of telecommunications, and in particular, to a software model for optical communication networks.

2. Description of the Prior Art

Wavelength-Division Multiplexing (WDM) is a key approach to increase the bandwidth of an optical network. As WDM technology continues to mature, there exists a large gap between the capacity of a WDM channel such as OC-48, OC-192 or OC-768 and the bandwidth requirement of a typical connection request such as STS-1, OC-3, and OC-12. If the entire bandwidth of a wavelength channel is allocated to a low rate connection, a large portion of the transmission capacity is wasted. In order to use the network resources efficiently, low-speed traffic streams need to be efficiently multiplexed, or "groomed", onto high speed lightpaths.

One problem with traffic grooming is the determination of how to set up lightpaths to satisfy connection request based on a set of connection requests and a network configuration including the physical topology, where each edge is a physical link, the number of transceivers at each node, the number of wavelengths on each fiber, and the capacity of each wavelength. Because of the sub-wavelength granularity of the connection requests, one or more connections can be multiplexed on the same lightpath.

With static traffic, the set of all connection requests is provided in advance. With dynamic traffic, connection requests are provided one at a time. Traffic grooming with static traffic has two optimization problems. One problem in a non-blocking scenario, where the network has enough resources to carry all of the connection requests, is to minimize the network cost while satisfying all the requests, where one cost component is the number of wavelength links and a wavelength-link is defined as a wavelength in a fiber-link. Another problem in a blocking scenario, where not all connections can be set up due to resource limitations, is to maximize the network throughput. With dynamic traffic, one optimization problem is to minimize the network resources used for each request, which implicitly attempts to minimize the blocking probability for future requests.

Traffic grooming is usually divided into four sub-problems, which are not necessarily independent: (1) determining the virtual topology that consists of lightpaths, (2) routing the lids over the physical topology, (3) performing wavelength assignment to the lightpaths, and (4) muting the traffic on the virtual topology. The virtual topology design problem is conjectured to be NP-hard. In addition, routing and wavelength assignment (RWA) is also NP-hard. Therefore, traffic grooming in a mesh network is also a NP-hard problem.

One prior solution is to solve the four sub-problems separately. First, the virtual topology is determined and then the routing and wavelength assignment is performed. Finally, the traffic requests are routed. Although this divide-and-conquer method makes traffic grooming easier to handle, it cannot achieve the optimal solution even if an optimal solution is realized for each sub-problem, since these four sub-problems are not necessarily independent and the solution from one sub-problem might affect how optimally another sub-problem can be solved. Sometimes, using the optimal solution for one sub-problem might not lead to the optimal solution to the whole problem. Moreover, this approach requires all the traffic request to be known in advance, which cannot be satisfied in dynamic grooming.

One solution is to solve the four sub-problems as a whole. By taking into account all the constrains regarding the four sub-problems simultaneously, this solution has a potential to achieve better performance. One prior solution with static traffic is formulated as an integer linear program (ILP). An optimal solution can be acquired for some relatively small networks. One problem with ILP is that ILPs are not scalable and cannot be directly applied to large networks.

Prior solutions for traffic grooming have mainly focused on SONET/WDM ring networks. Many of these solutions in static traffic grooming minimize the number of add-drop multiplexers (ADMs) because the ADMs are a major cost in the network. The general traffic-grooming problem in a SONET/WDM ring network is proven to be NP-complete. Unfortunately, many of these prior solutions focus on static traffic only. Some prior solutions use an optimal algorithm for a single-hub ring and several optimal or near-optimal algorithms for traffic grooming and wavelength assignment to reduce the number of wavelengths and SONET ADMs. One prior solution minimizes the network cost, which is dominated by SONET ADMs, in an optical add-drop wavelength-division-multiplexed (OADM) ring network. This solution includes six optical WDM ring architectures and compares the cost of different architectures, as well as the switching capabilities of different architectures under various traffic assumptions.

One prior solution grooms with arbitrary traffic in Bidirectional-Line-Switched-Rings (BLSRs). One prior solution provides a framework used to evaluate the performance of heuristics and requiring less computation than evaluating the optimal solution based on a general formulation of the virtual topology problem. Another prior solution formulates the grooming optimization problem as an integer linear program (ILP) and compare single-hop grooming and multi-hop grooming. One prior solution uses interconnected WDM rings instead of single-ring architectures and uses several strategies for traffic grooming in such networks. One problem with the majority of the prior solution is the focus on static traffic. One prior solution does address the dynamic traffic-grooming problem in SONET/WDM rings and formulates it as a bipartite graph-matching problem.

As fiber-optic backbone networks migrate from rings to mesh, traffic grooming on WDM mesh networks becomes an extremely important area of research. One prior solution formulates static traffic grooming problem as an ILP and proposes a heuristic to minimize the number of transceivers. Another prior solution presents several lower bounds for regular topologies and develops greedy and iterated greedy schemes. However, one problem with these two prior solutions is the relaxation of physical topology constraints and the assumption that all the virtual topologies are implementable on the given physical topology. These two prior solutions do not consider lightpath routing and wavelength assignment. One prior solution uses several node architectures for supporting traffic grooming in WDM mesh networks and formulas the static traffic-grooming problem as an ILP. This solution uses two heuristics and compares the performance with that of the ILP.

Some prior solutions consider a dynamic traffic pattern in WDM mesh networks. One such solution use a connection admission control scheme to fairness in terms of connection blocking. Another solution provides a theoretical capacity correlation model to compute the blocking probability for WDM networks with constrained grooming capability. Another prior solution use two possible route computation algorithms and proposes that, in order to achieve good performance in a dynamic environment, different grooming policies and route-computation algorithms need to be used under different network states. Another prior solution addresses how to dynamically establish reliable low-rate traffic in WDM mesh networks with traffic grooming and compares two grooming schemes. Another prior solution studies how to plan and design a WDM mesh network with certain forecast traffic demands to satisfy all the connections as well as minimize the network cost. Another prior solution investigates how to design multi-layer mesh networks to satisfy the connections' bandwidth and protection requirement while minimizing the overall network cost.

Challenges of Traffic Grooming in a Heterogeneous WDM Mesh Network

The WDM backbone network is expected to emerge as a multi-vendor, heterogenous network. As WDM networks migrate from ring topology to mesh topology, it is very important to solve the traffic grooming problem in a heterogeneous mesh network environment.

In terms of wavelength-conversion capability, heterogeneity means that some of the nodes in a network may have a full wavelength-conversion capability (any incoming wavelength can be converted into any outgoing wavelength), some may have no wavelength-conversion capability (traffic must stay in the same wavelength when bypassing these nodes), and some may have partial wavelength-conversion capability (some wavelengths can be converted into some wavelengths). In previous work, however, it was assumed that the nodes in a network either all have wavelength conversion capability or none has wavelength-conversion capability. In addition, if a node has this capability, it always has fill wavelength-conversion capability. This all-or-nothing assumption may not be practical or valid in the future WDM network. It is necessary to address the partial and sparse wavelength-conversion scenarios.

In a WDM mesh network, each node must support two functionalities: wavelength routing, which can be accomplished by an optical crossconnect (OXC), and optical multiplexing/demultiplexing, by which several wavelengths can be multiplexed to or demultiplexed from the same fiber-link. Besides, in order to groom low-speed connections onto a high-speed wavelength channel, a node will need to employ access stations, which can multiplex/demultiplex and switch low-speed connections using various multiplexing techniques, e.g. time-division multiplexing (TDM). A WDM mesh network may consist of systems from multiple vendors, and different vendors may employ different node architectures, which may have different grooming capabilities. Some architectures may have full grooming capabilities, while some may impose some constraints, such as the number of grooming ports (represented by the number of transceivers used for originating and terminating groomable wavelength channels), on the grooming capability. These partial and sparse scenarios are very practical and should also be considered when solving the traffic-grooming problem.

To solve the traffic-grooming problem, the integrated approach is desirable not only because it has the potential to achieve better performance than the separated approach, but also because it can be used directly for dynamic traffic grooming where the separated approach cannot be used. For a given connection request, the integrated approach should address the following issues: (1) should this connection be routed on the current virtual topology if it is possible to do so? Sometimes, it may be better to set up a new lightpath even though the connection can be carried on the current virtual topology. (2) How to change the virtual topology to accommodate the connection? i.e. between which two nodes should we set up a new lightpath, if any? In some cases, we can set up a light directly between the source of the traffic to the destination. In other cases, it is not necessary or possible to set up this lightpath and we may need to set up one or more lightpaths and route the connection onto these lightpaths and/or some existing lightpaths. Different decisions on these questions can result in different network performance. These decisions reflect the intentions of the network operator, and they are referred to as grooming policies. By using different grooming policies, a network operator can achieve various objectives, such as minimizing the number of wavelength-links, minimizing the number of lightpaths, minimizing the traffic hops on the virtual topology, etc. As the network state changes, the optimization objective may also need to change. Dynamically evolving the grooming policy according to the network state is also a challenge for traffic grooming.

SUMMARY OF INVENTION

The inventions solve the above problems by using a software model to operate an optical communication network with a plurality of optical nodes wherein the optical communication network use wavelength division multiplexing. A software model of the optical communication network is generated wherein the optical nodes are represented by access layers with access input ports and access output ports, lightpath layers with lightpath input ports and lightpath output ports and wavelength layers for each wavelength with wavelength input ports and wavelength output ports. The graphical links are then generated between the access input ports, the access output ports, the lightpath input ports, the lightpath output ports, the wavelength input ports, and the wavelength output ports based on capabilities of the optical nodes. A path is determined for communications between a source one of the optical nodes and a destination one of the optical nodes wherein the path is between one of the access output ports of the source one to the one of the access input ports of the destination one through either the lightpath layers or the wavelength layers based on the software model. A determination is then made of whether the path passes through any of the wavelength layers. A lightpath link is then generated for the graphical link of the path that pass through the wavelength layers and the wavelength corresponding to the wavelength layer is assigned to the lightpath.

In some embodiments, the optical communication network is in a mesh configuration. In some embodiments, a request is received for communications between a source one of the optical nodes and a destination one of the optical nodes. In some embodiments, weights are assigned to the graphical links. In other embodiments, the graphical links are deleted based on the capabilities of the optical nodes.

The inventions advantageously solves four sub-problems jointly: (1) determining the virtual topology that consists of lightpaths, (2) routing the lightpaths over the physical topology, (3) performing wavelength assignment to the lightpaths, and (4) routing the traffic on the virtual topology. In some embodiments, the graphical links and weights of these graphical links are manipulated to achieve various objectives using different grooming policies, while taking into account various constraints such as transceivers, wavelengths, wavelength conversion capabilities, and grooming capabilities. Also, the inventions may be applied to both static and dynamic traffic grooming.

BRIEF DESCRIPTION OF THE DRAWINGS

The same reference number represents the same element on all drawings.

DETAILED DESCRIPTION OF THE PREFERRED EMBODIMENT

FIGS. 1–9 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
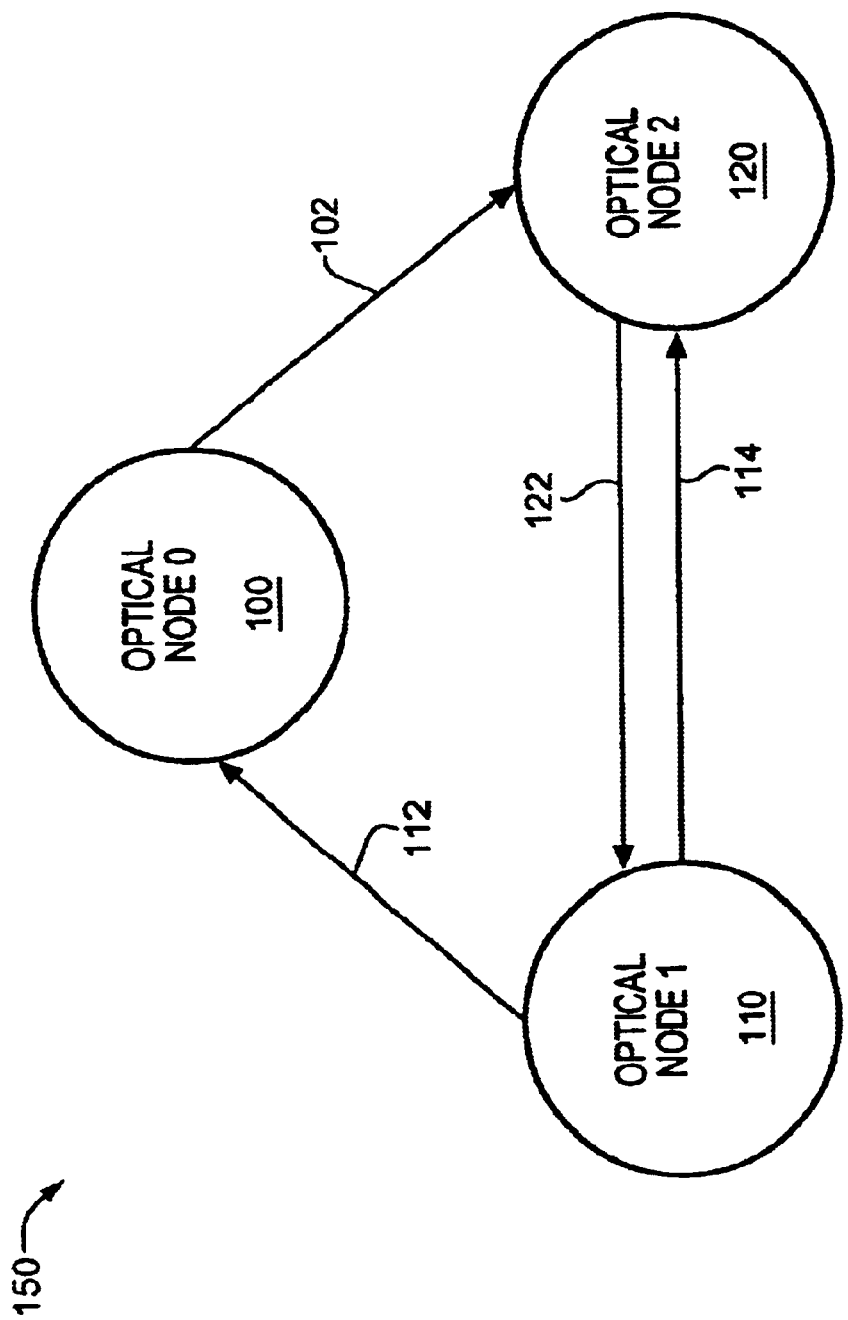
FIG. 1 is an illustration of an optical communication network in an example of the invention.
Figure 2:
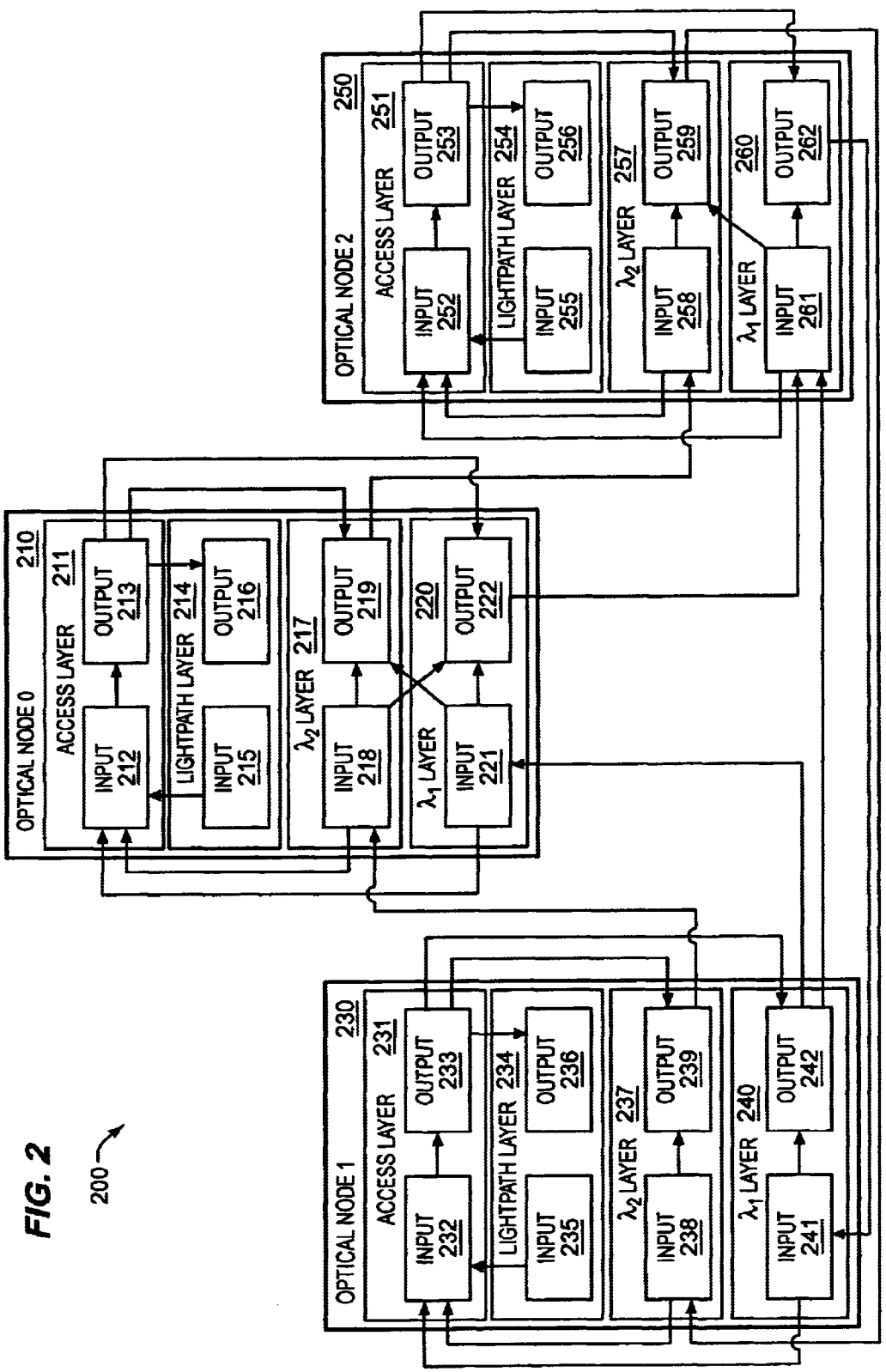
FIG. 2 is an illustration of a software model of the optical communication network in an example of the invention.

FIG. 1 depicts an illustration of an optical communication network 150 in an example of the invention. The optical communication network 150 comprises an optical node 0 100, an optical node 1 110, and an optical node 2 120. This example only depicts three optical nodes for the sake of simplicity. For other embodiments, the optical communication network 150 comprises numerous optical nodes. In some of these embodiments, these optical nodes are configured in a mesh type network. The optical node 0 100 is connected to the node 2 120 with an optical link 102. All the optical links in FIG. 2 are uni-directional. In other embodiments, the optical links could be bi-directional. For this example, the optical links carry two wavelengths. In other embodiments, the optical links carry numerous wavelengths. The optical node 0 100 is also connected to the optical node 1 110 with an optical link 112. The optical node 1 110 is connected to the optical node 2 120 with an optical link 122 and an optical link 114.

The optical nodes are any device, group of devices, or system configured to exchange optical signals. Some examples of optical nodes include transmitters, receivers, add/drop multiplexers, and/or wavelength converters.

FIG. 2 depicts an illustration of a software model 200 of the optical communication network 150 in an example of the invention. The software model 200 comprises an optical node 0 210, an optical node 1 230, and an optical node 2 250. The optical node θ 210 comprises an access layer 211, a lightpath layer 214, a $\lambda_2$ layer 217, and a $\lambda_1$ layer 220. The $\lambda_2$ layer 217 and the $\lambda_1$ layer 220 are wavelength layers that correspond to wavelengths $\lambda_2$ and $\lambda_1$, respectively. Each optical node has an input port and an output port for each layer. The access layer 211 comprises an access input port 212 and an access output port 213. The lightpath layer 214 comprises a lightpath input port 215 and a lightpath output port 216. The $\lambda_2$ layer 217 comprises a wavelength input port 218 and a wavelength output port 219. The $\lambda_1$ layer 220 comprises a wavelength input port 221 and a wavelength output port 222.

The optical node 1 230 comprises an access layer 231, a lightpath layer 234, a $\lambda_2$ layer 237, and a $\lambda_1$ layer 240. The $\lambda_2$ layer 237 and the $\lambda_1$ layer 240 are wavelength layers that correspond to wavelengths $\lambda_2$ and $\lambda_1$, respectively. The access layer 231 comprises an access input port 232 and an access output port 233. The lightpath layer 234 comprises a lightpath input port 235 and a lightpath output port 236. The $\lambda_2$ layer 237 comprises a wavelength input port 238 and a wavelength output port 239. The $\lambda_1$ layer 240 comprises a wavelength input port 241 and a wavelength output port 242.

The optical node 2 250 comprises an access layer 251, a lightpath layer 254, a $\lambda_2$ layer 257, and a $\lambda_1$ layer 260. The $\lambda_2$ layer 257 and the $\lambda_1$ layer 260 are wavelength layers that correspond to wavelengths $\lambda_2$ and $\lambda_1$, respectively. The access layer 251 comprises an access input port 252 and an access output port 253. The lightpath layer 254 comprises a lightpath input port 255 and a lightpath output port 256. The $\lambda_2$ layer 257 comprises a wavelength input port 258 and a wavelength output port 259. The $\lambda_1$ layer 260 comprises a wavelength input port 261 and a wavelength output port 262. The input port and output ports in the software model 200 are connected by edges, which are discussed further below.

A software model is a graphical representation of the optical communication network 150 that include representations of the optical nodes or vertices in the optical communication network and their corresponding links or edges that interconnect the optical nodes. The software model 200 is a graphical representation that is represented by G(V, E) where V and E are a set of vertices and a set of edges, respectively. An input port is a representation for the input to an optical node. An output port is a representation for the output to an optical node. A port is represented by $N_i^{l,p}$, where a port p is on layer l at node i. A set of vertices, V, is represented as follows:

$$V = \{N_i^{l,p} | p \in \{0,1\}, 1 \le l \le W+2, \forall i \in V_0\}$$

where $N_i^{l,0}$ and $N_i^{l,1}$ are the input port and the output port on layer l at node i, respectively;

$V_O$ is a set of optical nodes in the network; and

W is the number of wavelengths on each fiber link and the number of wavelength layers.

An access layer is a representation of the input and output access to the optical node. A lightpath layer is a representation of the input and output for lightpaths that interconnect the optical nodes. A lightpath is any link or connection that interconnect optical nodes and that include at least one wavelength-link. A wavelength layer is a representation of the input and the output of the optical node that correspond to a wavelength that is an input or output to the optical node. A path is connection, link, group of connections, or links that interconnect a source optical node with a destination optical node. A graphical link is any connection or link that interconnects ports in the software model 200. Graphical links are also called edges. Each edge in the software model 200 has a property tuple, PT(c,w), associated with it, where c is the capacity of the edge and w is the weight of the edge.

Figure 3:
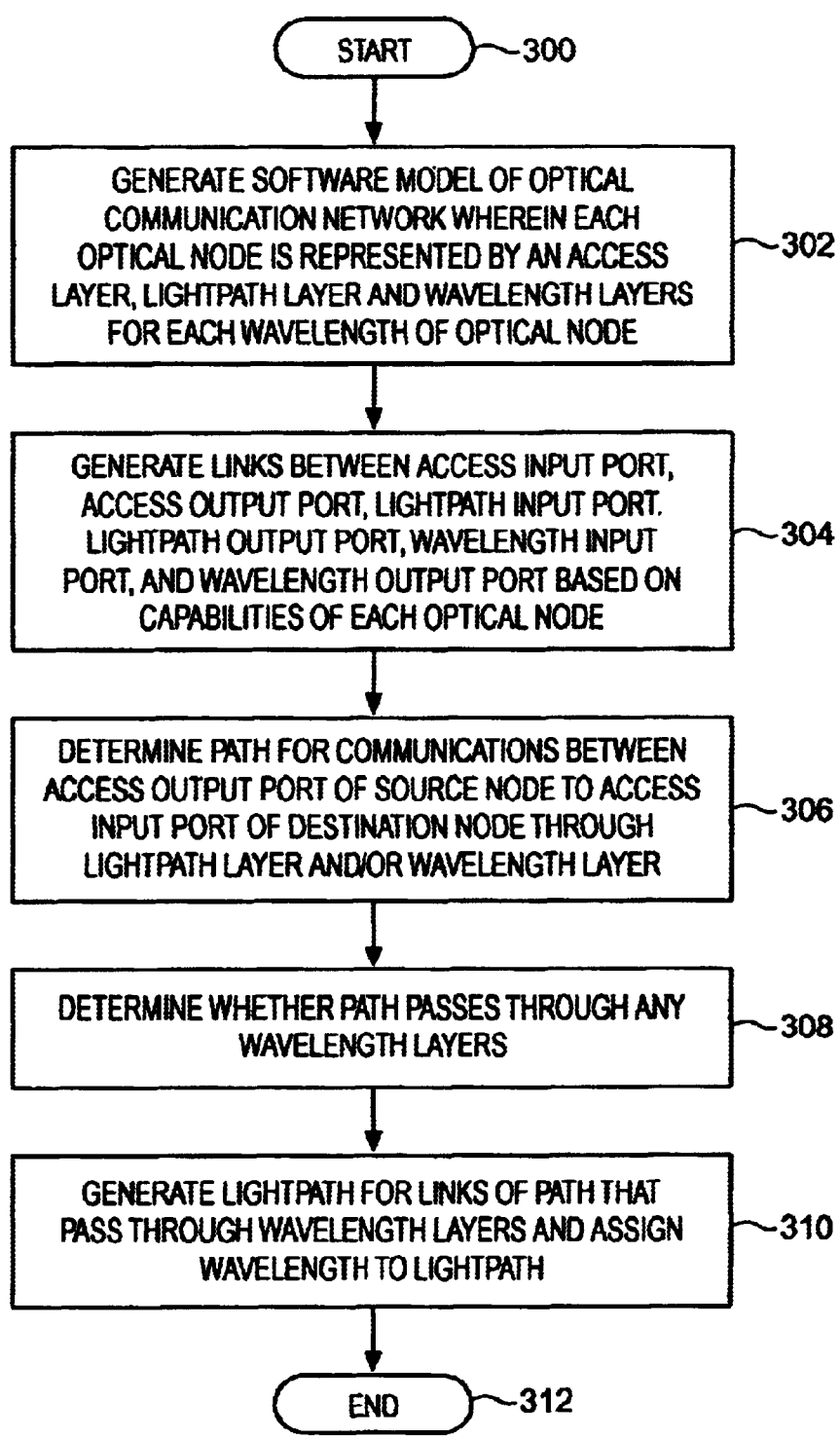
FIG. 3 is a flow chart for a software model in an example of the invention.

FIG. 3 depicts a flow chart for the software model 200 in an example of the invention FIG. 3 begins in step 300. In step 302, a software model of the optical communication network is generated wherein the optical nodes are represented by access layers with access input ports and access output ports, lightpath layers with lightpath input ports and lightpath output ports and wavelength layers for each wavelength with wavelength input ports and wavelength output ports. In step 304, graphical links are generated between the access input ports, the access output ports, the lightpath input ports, the lightpath output ports, the wavelength input ports, and the wavelength output ports based on capabilities of the optical nodes. In step 306, a path is determined for communications between a source one of the optical nodes and a destination one of the optical nodes wherein the path is between one of the access output ports of the source one to the one of the access input ports of the destination one through the lightpath layers and/or the wavelength layers based on the software model. In step 308, a determination is made of whether the path passes through any of the wavelength layers. In step 310, a lightpath link is then generated for the graphical links of the path that pass through the wavelength layers and the wavelength corresponding to the wavelength layer is assigned to the lightpath. FIG. 3 ends in step 312.

Figure 4:
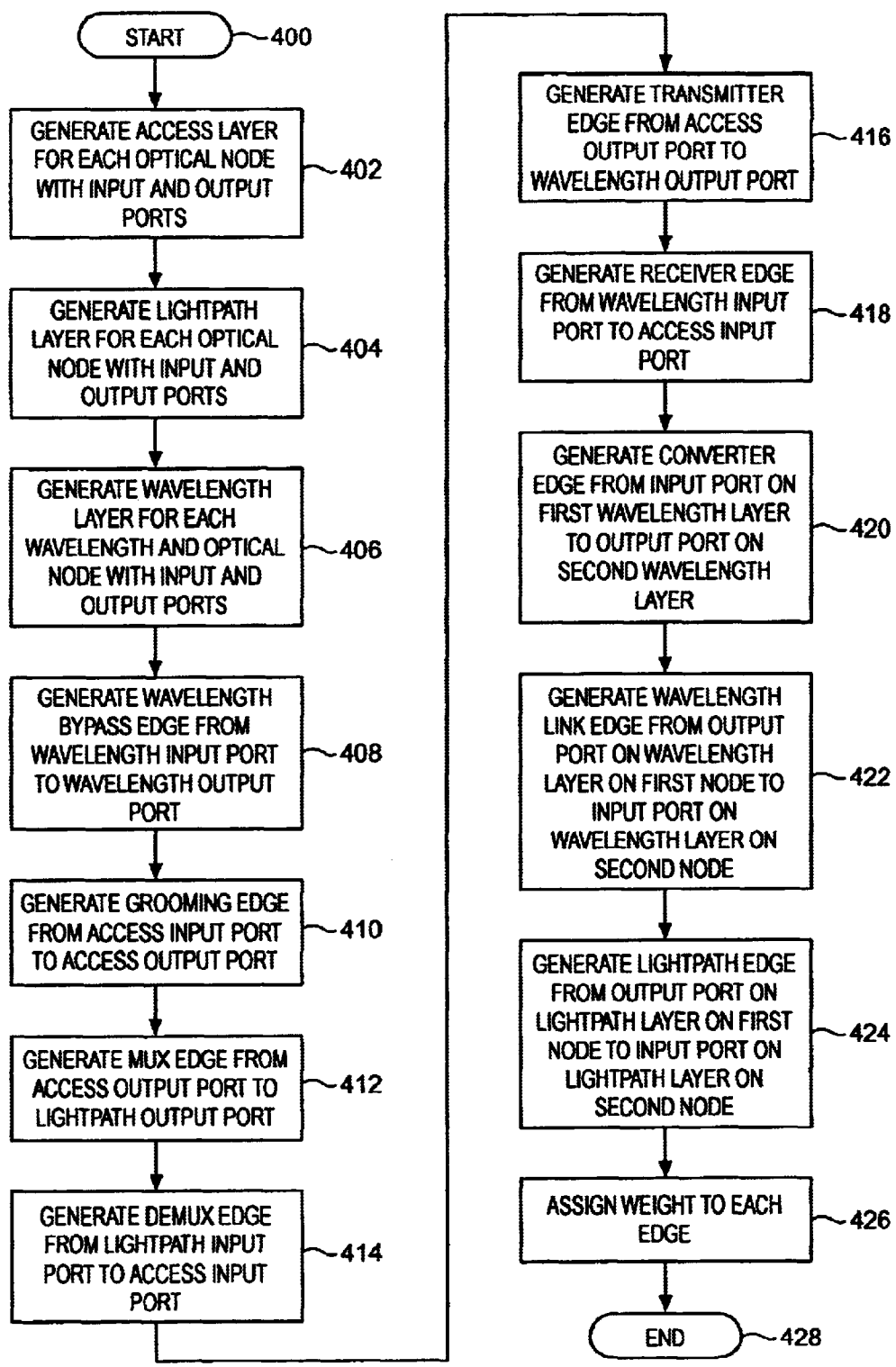
FIG. 4 is a flow chart for generating a software model in an example of the invention.

FIG. 4 depicts a flow chart for generating a software model 200 in an example of the invention. FIG. 4 begins in step 400. In step 402, the access layers with access input ports and access output ports are generated for each optical node. In step 404, the lightpath layers with lightpath input ports and lightpath output ports are generated for each optical node. In step 406, the wavelength layers with wavelength input ports and wavelength output ports are generated for each wavelength for each optical node.

In step 408, a wavelength bypass edge is generated from the wavelength input port to the wavelength output port for each wavelength layer at each optical node. This wavelength bypass edge is represented as follows:

$$<N_i^{l,0}, N_i^{l,1}> \epsilon E \forall i \epsilon V_O, 1 \leq l \leq W$$

This wavelength bypass edge on layer l at node i is denoted as WBE(i,l). In this embodiment, the capacity of the wavelength bypass edge is ∞. In FIG. 2, the wavelength input port 218 is connected to the wavelength output port 219 with a wavelength bypass edge for $\lambda_2$ at the optical node 0 210. The wavelength input port 221 is connected to the wavelength output port 222 with a wavelength bypass edge for $\lambda_1$ at the optical node 0 210. The wavelength input port 238 is connected to the wavelength output port 239 with a wavelength bypass edge for $\lambda_2$ at the optical node 1 230. The wavelength input port 241 is connected to the wavelength output port 242 with a wavelength bypass edge for $\lambda_1$ at the optical node 1 230. The wavelength input port 258 is connected to the wavelength output port 259 with a wavelength bypass edge for $\lambda_2$ at the optical node 2 250. The wavelength input port 261 is connected to the wavelength output port 262 with a wavelength bypass edge for $\lambda_1$ at the optical node 2 250.

In step 410, a grooming edge is generated from the access input port to the access output port for each access layer at an optical node if the optical node has grooming capabilities. This grooming edge is represented as follows:

$$<N_i^{W+2,0}, N_i^{W+2,1}> \epsilon E \forall i \epsilon V_O$$

This grooming edge at node i is denoted as GrmE(i). In this embodiment, the capacity of the grooming edge is ∞. In FIG. 2, the access input port 212 is connected to the access output port 213 with a grooming edge for the access layer 211 at the optical node 0 210. The access input port 232 is connected to the access output port 233 with a grooming edge for the access layer 231 in the optical node 1 230. The access input port 252 is connected to the access output port 253 with a grooming edge for the access layer 251 in the optical node 2 250.

In step 412, a mux edge is generated from the access output port on the access layer to the lightpath output port on the lightpath layer at each optical node. This mux edge is represented as follows:

$$<N_i^{W+2,1}, N_i^{W+1,1}> \epsilon E \forall i \epsilon V_O$$

This mux edge at node i is denoted as MuxE(i). In this embodiment, the capacity of the mux edge is ∞. In FIG. 2, the access output port 213 for the access layer 211 is connected to the lightpath output port 216 for the lightpath layer 214 with a mux edge in the optical node 0 210. The access output port 233 for the access layer 231 is connected to the lightpath output port 236 for the lightpath layer 234 with a mux edge in the optical node 1 230. The access output port 253 for the access layer 251 is connected to the lightpath output port 256 for the lightpath layer 254 with a mux edge in the optical node 2 250.

In step 414, a demux edge is generated from the lightpath input port on the lightpath layer to the access input port on the access layer at each optical node. This demux edge is represented as follows:

$$<N_i^{W+1,0}, N_i^{W+2,0}> \epsilon E \forall i \epsilon V_O$$

This demux edge at node i is denoted as DmxE(i). In this embodiment, the capacity of the demux edge is ∞. In FIG. 2, the lightpath input port 215 for the lightpath layer 214 is connected to the access input port 212 for the access layer 211 with a demux edge in the optical node 0 210. The lightpath input port 235 for the lightpath layer 234 is connected to the access input port 232 for the access layer 231 with a demux edge in the optical node 1 230. The lightpath input port 255 for the lightpath layer 254 is connected to the access input port 252 for the access layer 251 with a demux edge in the optical node 2 250.

In step 416, a transmitter edge is generated from the access output port on the access layer to the wavelength output port on the wavelength layer if there is a transmitter available on wavelength $\lambda_1$ at the optical node. This transmitter edge is represented as follows:

$$<N_i^{W+2,1}, N_i^{l,1}> \epsilon E \forall i \epsilon V_O, 1 \leq l \leq W, TX_i^l > 0,$$

where $TX_i^1$ denotes the number of transmitters that can operate at wavelength $\lambda_1$ at optical node i.

This transmitter edge on layer 1 at node i is denoted as TxE(i, l). In this embodiment, the capacity of the transmitter edge is ∞. In FIG. 2, the access output port 213 for the access layer 211 is connected to the wavelength output port 219 for the wavelength layer 217 for wavelength $\lambda_2$ with a transmitter edge in the optical node 0 210. The access output port 213 for the access layer 211 is connected to the wavelength output port 222 for the wavelength layer 220 for wavelength $\lambda_1$ with a transmitter edge in the optical node 0 210. The access output port 233 for the access layer 231 is connected to the wavelength output port 239 for the wavelength layer 237 for wavelength $\lambda_2$ with a transmitter edge in the optical node 1 230. The access output port 233 for the access layer 231 is connected to the wavelength output port 242 for the wavelength layer 240 for wavelength $\lambda_1$ with a transmitter edge in the optical node 1 230. The access output port 253 for the access layer 251 is connected to the wavelength output port 259 for the wavelength layer 257 for wavelength $\lambda_2$ with a transmitter edge in the optical node 2 250. The access output port 253 for the access layer 251 is connected to the wavelength output port 262 for the wavelength layer 260 for wavelength $\lambda_1$ with a transmitter edge in the optical node 2 250.

In step 418, a receiver edge is generated from the wavelength input port on the wavelength layer to the access input port on the access layer if there is a receiver available on wavelength $\lambda_1$ at the optical node. This transmitter edge is represented as follows:

$$<N_i^{l,0}, N_i^{W+2,0}> \in E \forall i \in V_0, 1 \le l \le W, RX_i^l > 0,$$

where $RX_i^l$ denotes the number of receivers that can operate at wavelength $\lambda_1$ at optical node i.

This receiver edge on layer 1 at node i is denoted as RxE(i,l). In this embodiment, the capacity of the receiver edge is ∞. In FIG. 2, the wavelength input port 218 for wavelength $\lambda_2$ is connected to access input port 212 with a receiver edge in the optical node 0 210. The wavelength input port 221 for wavelength $\lambda_1$ is connected to access input port 212 with a receiver edge in the optical node 0 210. The wavelength input port 238 for wavelength $\lambda_2$ is connected to access input port 232 with a receiver edge in the optical node 1 230. The wavelength input port 241 for wavelength $\lambda_1$ is connected to access input port 232 with a receiver edge in the optical node 1 230. The wavelength input port 258 for wavelength $\lambda_2$ is connected to access input port 252 with a receiver edge in the optical node 2 230. The wavelength input port 261 for wavelength $\lambda_1$ is connected to access input port 252 with a receiver edge in the optical node 2 250.

In step 420, a converter edge is generated from the wavelength input port on the wavelength layer for $\lambda_{l1}$ to the wavelength output port on the wavelength layer for $\lambda_{l2}$ if the wavelength $\lambda_{l1}$ can be converted to wavelength $\lambda_{l2}$ without using an access station at the optical node. This converter edge is represented as follows:

$$<N_i^{l_1,0}, N_i^{l_2,1}> \in E \forall i \in V_0, \text{ wavelength } l_1 \text{ is convertible to } l_2 \text{ at node } i$$

This converter edge from layer $l_1$ to layer $l_2$ at node i is denoted as CvtE(i,$l_1$,$l_2$). In this embodiment, the capacity of the converter edge is ∞. In FIG. 2, the optical node 0 210 has full wavelength-conversion capabilities. The wavelength input port 218 for wavelength $\lambda_2$ is connected to the wavelength output port 222 for wavelength $\lambda_1$ with a converter edge in the optical node 0 210. The wavelength input port 221 for wavelength $\lambda_1$ is connected to the wavelength output port 219 for wavelength $\lambda_2$ with a converter edge in the optical node 0 210. The optical node 2 250 has partial wavelength conversion capabilities where wavelength $\lambda_1$ can be converted to wavelength $\lambda_2$. The wavelength input port 261 for wavelength $\lambda_1$ is connected to the wavelength output port 259 for wavelength $\lambda_2$ with a converter edge in the optical node 2 250.

In step 422, a wavelength edge is generated from the wavelength output port at optical node i to the wavelength input port at optical node j on wavelength $\lambda_1$, if there is a physical fiber link from node i to node j and wavelength $\lambda_1$ on this link is not used. This wavelength edge is represented as follows:

$$<N_i^{l,1}, N_j^{l,0}> \in E(i,j) \in E_0, \text{ wavelength } \lambda_1 \text{ on link } (i,j) \text{ is not used}$$

This wavelength edge from layer 1 from node i to node j is denoted as WLE(i,j,l). In this embodiment, the capacity of the wavelength edge is the capacity of the corresponding wavelength $\lambda_1$ from node i to node j. In FIG. 2, the wavelength output port 219 for wavelength $\lambda_2$ in the optical node 0 210 is connected to the wavelength input port 258 for wavelength $\lambda_2$ in the optical node 2 250 with a wavelength edge. The wavelength output port 222 for wavelength $\lambda_1$ in the optical node 0 210 is connected to the wavelength input port 261 for wavelength $\lambda_1$ in the optical node 2 250 with a wavelength edge. The wavelength output port 259 for wavelength $\lambda_2$ in the optical node 2 250 is connected to the wavelength input port 238 for wavelength $\lambda_2$ in the optical node 1 230 with a wavelength edge. The wavelength output port 262 for wavelength $\lambda_1$ in the optical node 2 250 is connected to the wavelength input port 241 for wavelength $\lambda_1$ with a wavelength edge in the optical node 1 230. The wavelength output port 239 for wavelength $\lambda_2$ in the optical node 1 230 is connected to the wavelength input port 218 for wavelength $\lambda_2$ in the optical node 0 210 with a wavelength edge. The wavelength output port 242 for wavelength $\lambda_1$ in the optical node 1 230 is connected to the wavelength input port 221 for wavelength $\lambda_1$ with a wavelength edge in the optical node 0 210.

In step 424, a lightpath edge is generated from the lightpath output port at optical node i to the lightpath input port at optical node j. This converter edge is represented as follows:

$$<N_i^{W+1,1}, N_j^{W+1,0}> \in E \; \exists \text{ a lightpath from node } i \text{ to node } j$$

This lightpath edge from node i to node j is denoted as LPE(i,j). In this embodiment, the capacity of the lightpath edge is the residual capacity of the corresponding light from node i to node j.

In step 426, the weight is assigned to each edge. In this example the weight W is determined for the property tuple PT(c,w) of each edge. In different embodiments, the weights present the cost of each network element such as transceivers, wavelength links, and wavelength converters. In some embodiments, the weights represent certain grooming policies. In some embodiments, the weights are fixed values. In other embodiments, the weights are adjusted based on the current network state. FIG. 4 ends in step 428.

Figure 5:
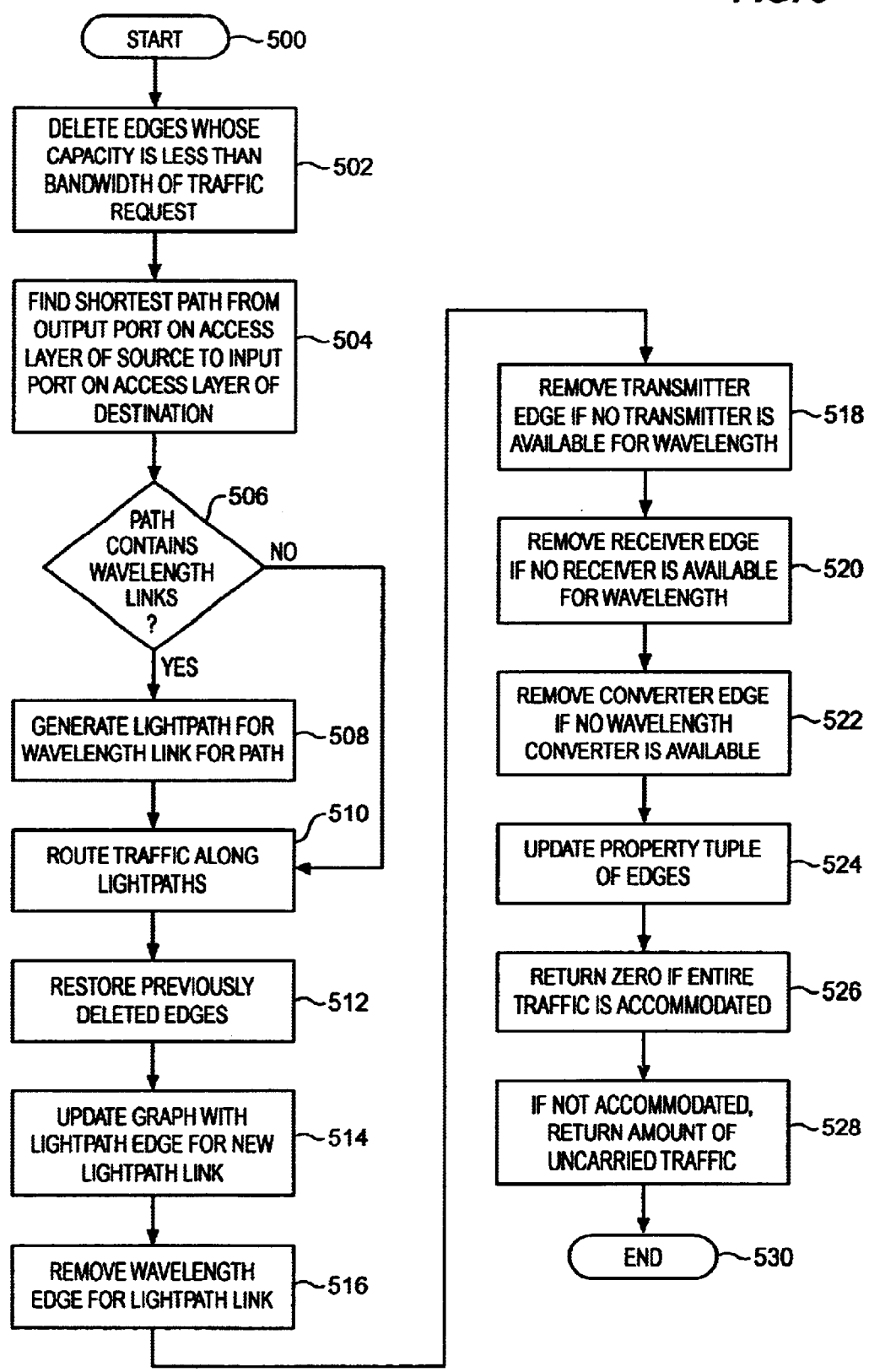
FIG. 5 is a flow chart for an integrated grooming algorithm based on an auxiliary graph in an example of the invention.

The software model is also called auxiliary graph. FIG. 5 depicts a flow chart for an integrated grooming algorithm based on the auxiliary graph (IGABAG) in an example of the invention. FIG. 5 begins in step 500. This flowchart uses the auxiliary graph constructed in FIG. 4. The input of the flowchart in FIG. 5 is the traffic demand, T(s,d,g,m), where s and d are source and destination nodes, g is the granularity of the traffic demand, and m is the amount of traffic in units of g. In step 502, the edges of the auxiliary graph whose capacity is less than the granularity of T are deleted since the deleted edges cannot accommodate T. In step 504, the shortest path, P, is found from the access output port on the access layer of the source node to the access input port on the access layer of the destination node of T on graph G. If the shortest path cannot be found, the deleted edges from step 502 are restored and a "−1" is returned.

In step 506, the shortest path, p, is checked for whether p contains any wavelength links. If p contains wavelengths, one or more lightpaths going through these wavelength-links are set up in step 508. A lightpath start whenever p travels through a transmitter edge, follows the subsequent wavelength-link edges and terminates at the first receiver edge. In step 510, the traffic, T, is routed along the pre-existing lightpaths in p and/or the lightpaths set up according to p in step 508. If the capacity of path, which is defined as the minimum capacity of the lightpaths along the path, is less than the entire amount of T, the maximum amount possible n units are routed. In step 512, the deleted edges from step 502 are restored.

In step 514, the graph, G, is updated with each newly set up lightpath. The lightpath edge from the lightpath output port of the starting node to the lightpath input port of the terminating node is added on the lightpath layer. In step 516, the wavelength-link edges denoting the wavelength-links used by the lightpath are removed from the corresponding wavelength layers. If there are multiple fiber-links between nodes, the wavelength-link edges are removed only when the corresponding wavelengths on all the fiber-links are used. Advantageously, this algorithm can be used in cases where multiple fiber-links exist between the same node pair. In step 518, the transmitter edge, TxE(i, l) is removed from G if there is no transmitter available at node i on wavelength $\lambda_1$, i.e., this node cannot source a lightpath on wavelength $\lambda_1$ any more and can only be bypassed by a lightpath. In step 520, the receiver edge, RxE(i, l) is removed from G if there is no receiver available at node i on wavelength $\lambda_1$, i.e., this node cannot sink a lightpath on wavelength $\lambda_1$ any more and can only be bypassed by a lightpath.

In step 522, the converter edge CvtE(i,l_1,l_2) is removed from G if there is no wavelength converter which can convert from wavelength $\lambda_{i1}$ to wavelength $\lambda_{i2}$ available at node i. In step 524, the property tuple, PT(c,w), of the edges are updated. For the lightpaths carrying the traffic T, the capacities of the lightpath edges denoting the lightpaths carrying the traffic T are decreased by the amount of the traffic routed. Updating the weights of the edges in the graph G change the grooming policies discussed below.

If the entire traffic is accommodated, a "0" is returned in step 526. Otherwise, the amount of the uncarried traffic in units of m−n of g is returned in step 528. FIG. 5 ends in step 530. The flowchart in FIG. 5 routes a given traffic request under the current network state and updates the network state after routing. Thus, the auxiliary graph reflects the current network state.

Figure 6:
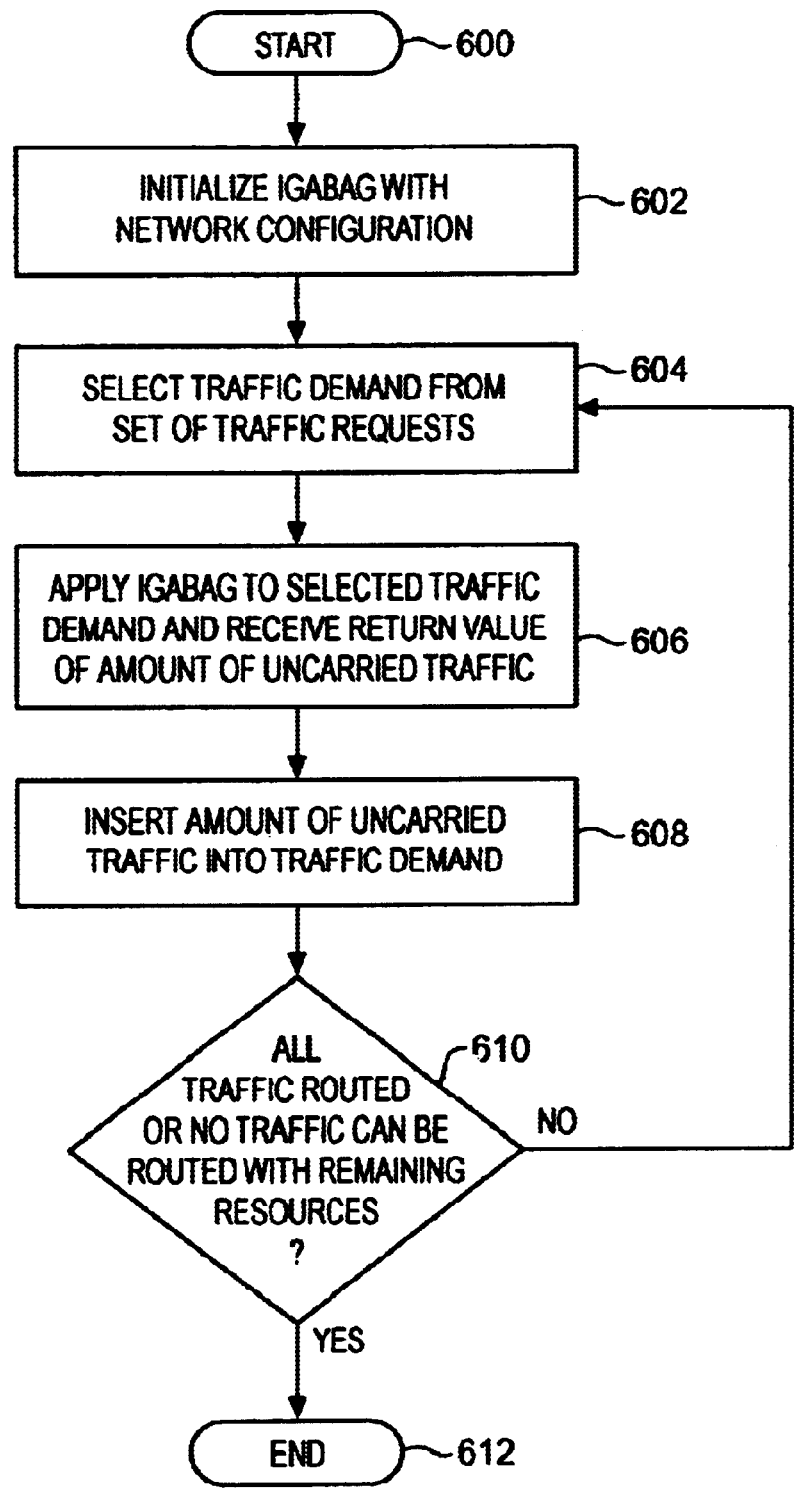
FIG. 6 is a flow chart for an integrated grooming procedure in an example of the invention.

FIG. 6 depicts a flow chart for an integrated grooming procedure (INGPROC) in an example of the invention. The input to this flow chart is the network configuration and a set of traffic requests. FIG. 6 begins in step 600. In step 602, the IGABAG procedure described in FIG. 5 is initialized with the network configuration. In step 604, a traffic demand, T(s,d,g,m), is selected from the traffic request set. In step 606, the IGABAG procedure described in FIG. 5 is applied to the traffic demand T and the return value k, which is the amount of uncarried traffic, is returned from the IGABAG procedure. If k>0, the traffic demand T(s,d,g,k) is inserted into the request set. In step 610, a determination is made whether all the traffic is routed or no traffic can be routed with the remaining resources. If all the traffic is not routed and the traffic can be routed with the remaining resources, the process returns to step 604. Otherwise, FIG. 6 ends in step 612.

The INGPROC can be applied to both static and dynamic grooming. For dynamic grooming, the INGPROC procedure chooses the current traffic request in step 604. For static grooming, all traffic demands are known in advance. The order in which the requests are routed is important in achieving good performance. One embodiment for static grooming called least cost first (LCF) chooses the most cost-effective traffic request under the current network state and routes the chosen request. In this embodiment, the cost of a traffic request is the weight of the shortest path for routing the traffic on the corresponding auxiliary graph divided by the amount of the traffic, which is computed as the granularity multiplied by the units of the traffic. After routing a connection, the LCF needs to re-compute the cost of the un-routed connections under the updated network state.

Another embodiment for static grooming called maximum utilization first (MUF) select the connection with the highest utilization. In this embodiment, the utilization is the total amount of the request divided by the number of hops from the source node to the destination node on the physical topology. Another embodiment for static grooming called maximum amount first (MAF) selects the connection with the largest amount of demand and routes it.

Figure 7A:
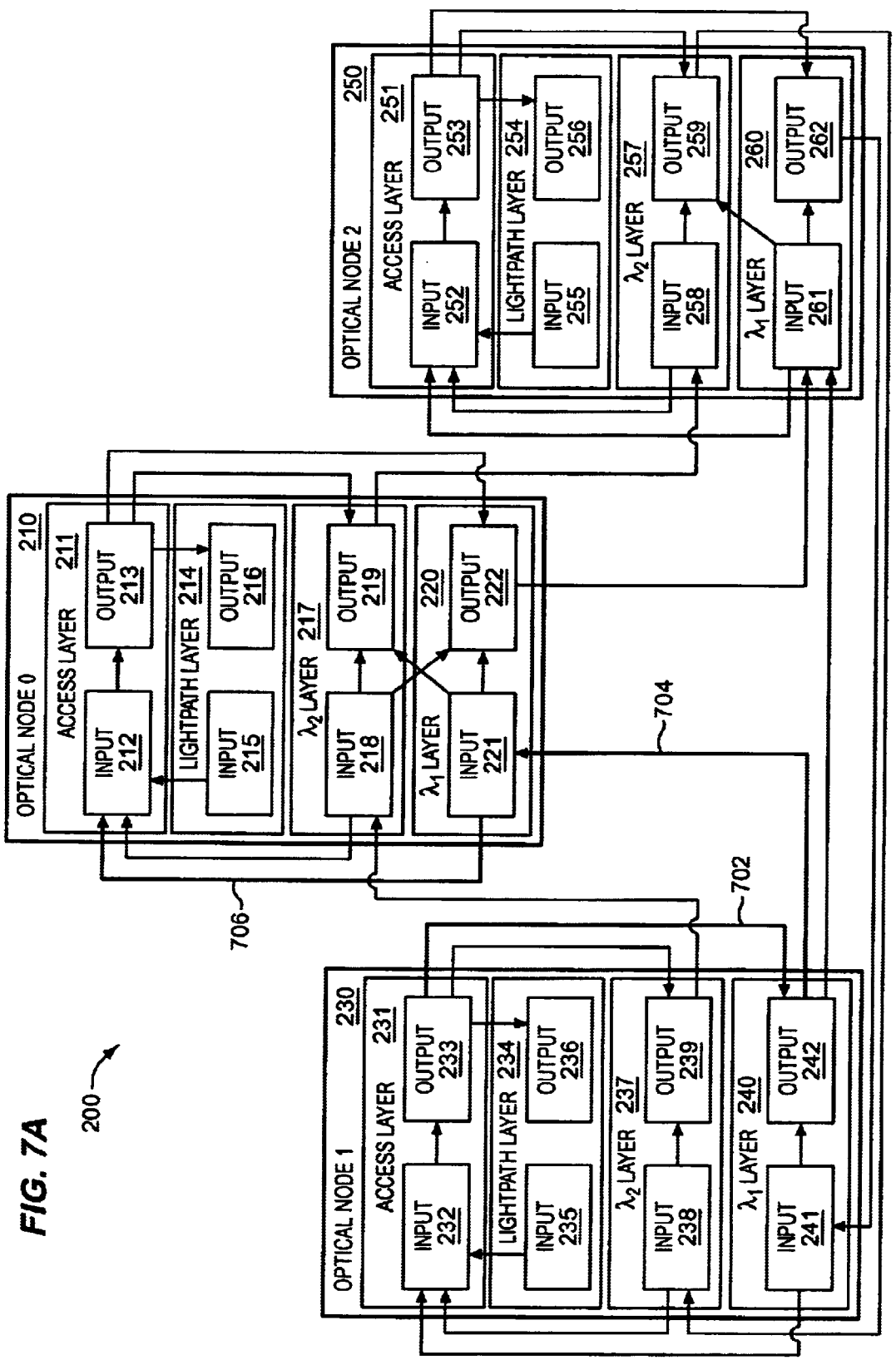
FIGS. 7A–7F are illustrations of the software model of the optical communication network in examples of the invention.
Figure 7B:
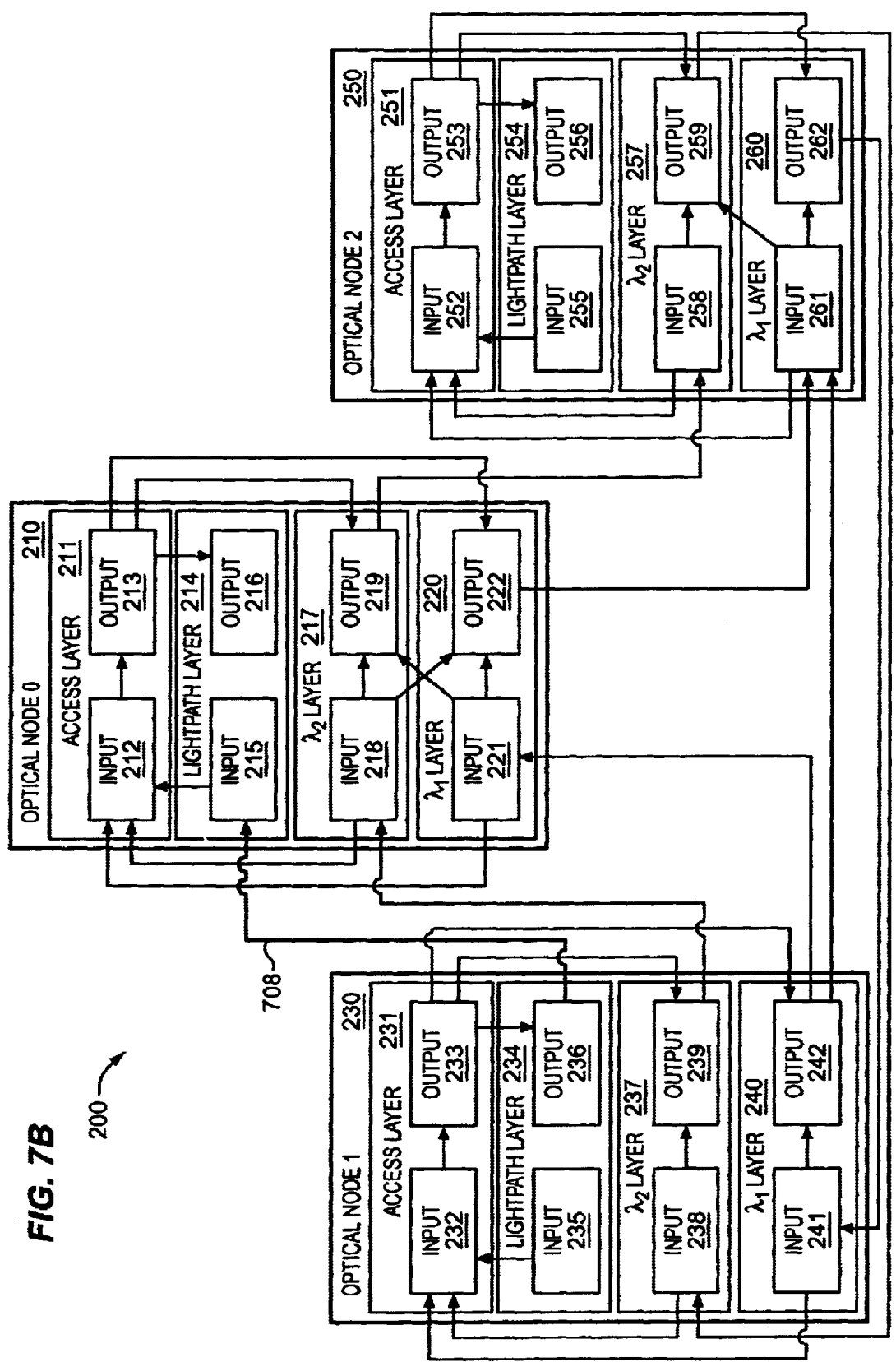
Figure 7C:
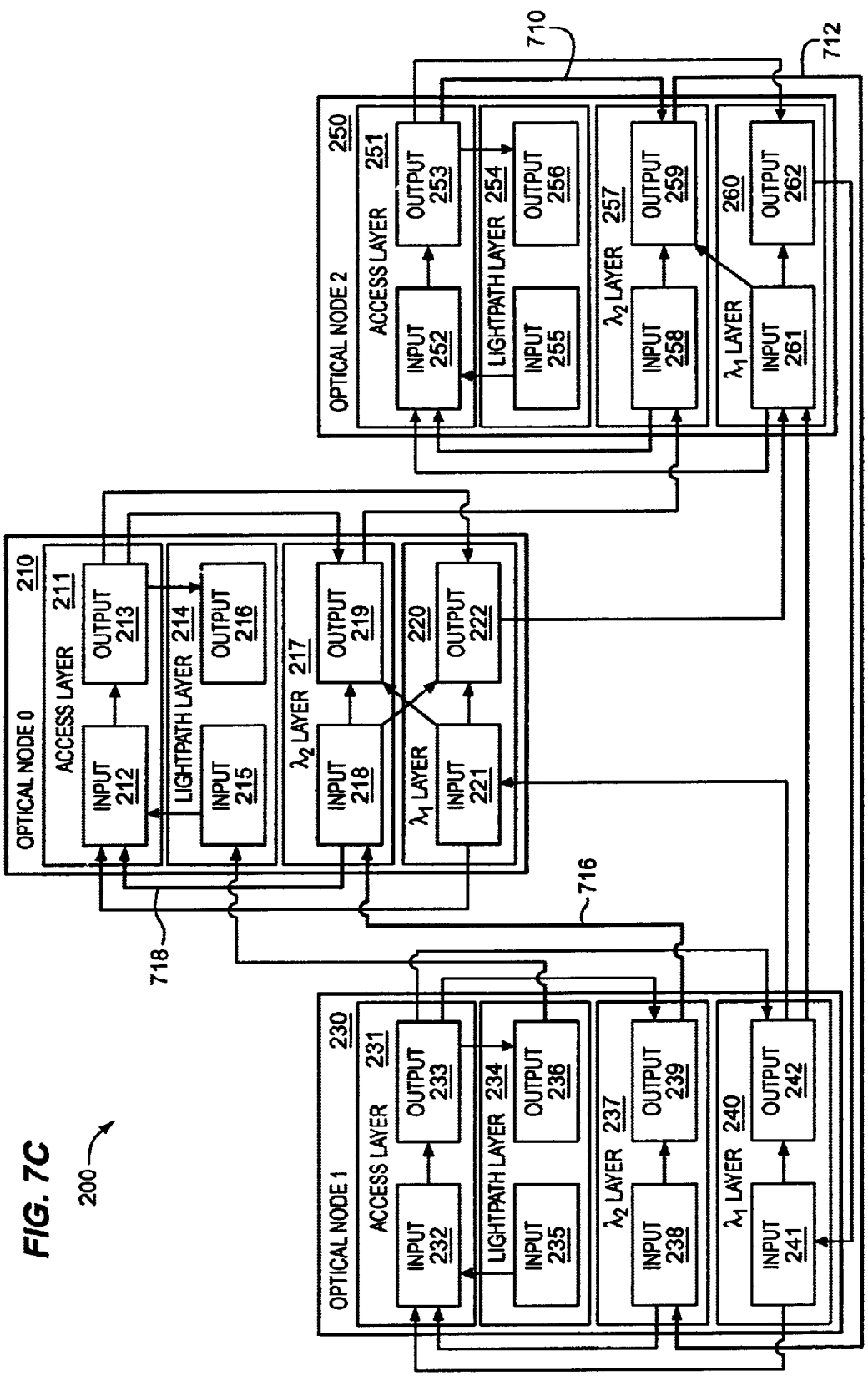

The following is an example of establishing a connection from node 1 to node 2. In this example, the capacity of each wavelength is OC-48. Also, in this example, each node has grooming capabilities and two tunable transceivers. The first connection request, $T_1$, is T (1, 0, OC-12, 2). A path from $N^{4,1}_1$ to $N^{4,0}_0$ needs to be found. One path from Node 0 to Node 1 exists along the edges TxE(1,1) 702, WLE(1,0,1) 704 and RxE(0,1) 706 as depicted as bold lines in FIG. 7A. A lightpath $L^1$ using $\lambda_1$ on the fiber-link from node 1 230 to node 0 210 needs to be set up because the path includes a wavelength-link edge WLE(1,0,1) 704. After setting up $L_i$, a lightpath edge LPE(1,0) 708 is setup on the graph as depicted in FIG. 7B. The wavelength-link edge WLE(1,0,1) 704 is removed as depicted in FIG. 7B because this wavelength-link cannot be used to set up another lightpath later on. This connection $T_1$ then can be routed onto lightpath $L_1$ and the residual capacity is 2×OC-12. Thus, the capacity of edge LPE(1,0) 708 is 24, which is equivalent to 24 OC-1s.

Figure 7D:
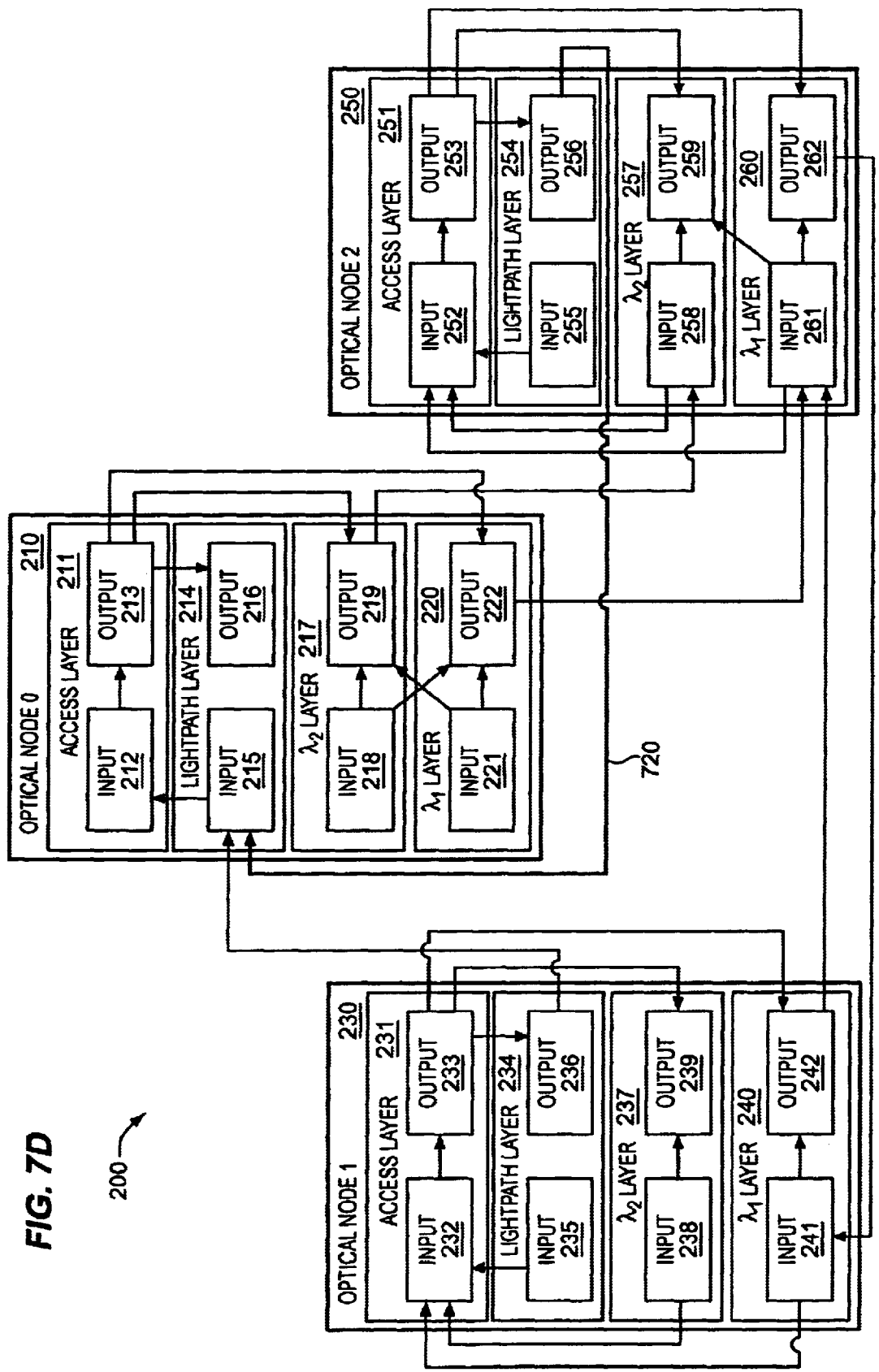

The second connection request $T_2$ is T(2,0,OC-12,1). A path from $N^{4,1}_2$ to $N^{4,0}_0$ needs to be found. There are several possible paths for this connection request. For a single-hop grooming embodiment, one path is along the edges of TxE(2,2) 710, WLE(2,1,2) 712, WBE(1,2), WLE(1,0,2) 716, and RxE(0,2) 718 as depicted in bold lines in FIG. 7C. This path contains edges WLE(2,1,2) 712 and WLE(1,0,2) 716, which denotes wavelength $\lambda_2$ on the fiber-links from node 2 250 to node 1 230 and from node 1 230 to node 0 210 respectively. A lightpath $L_2$ including these two wavelength links needs to be set up. As a result, a light edge LPE(2,0) 720 is added to the graph and the two wavelength edges WLE(2,1,2) 712 and WLE(1,0,2) 716 are removed as depicted in FIG. 7D. Since both receivers at node 0 are used, all the receiver edges at node 0 are removed, which represents that node 0 cannot sink any more lightpaths. After the traffic is routed onto lightpath $L_2$, the capacity of lightpath edge LPE (2,0) is 36 units. In this embodiment, one lightpath uses two wavelength-links. Since the connection traverses a single lightpath, this is called singled-hop grooming.

Figure 7E:
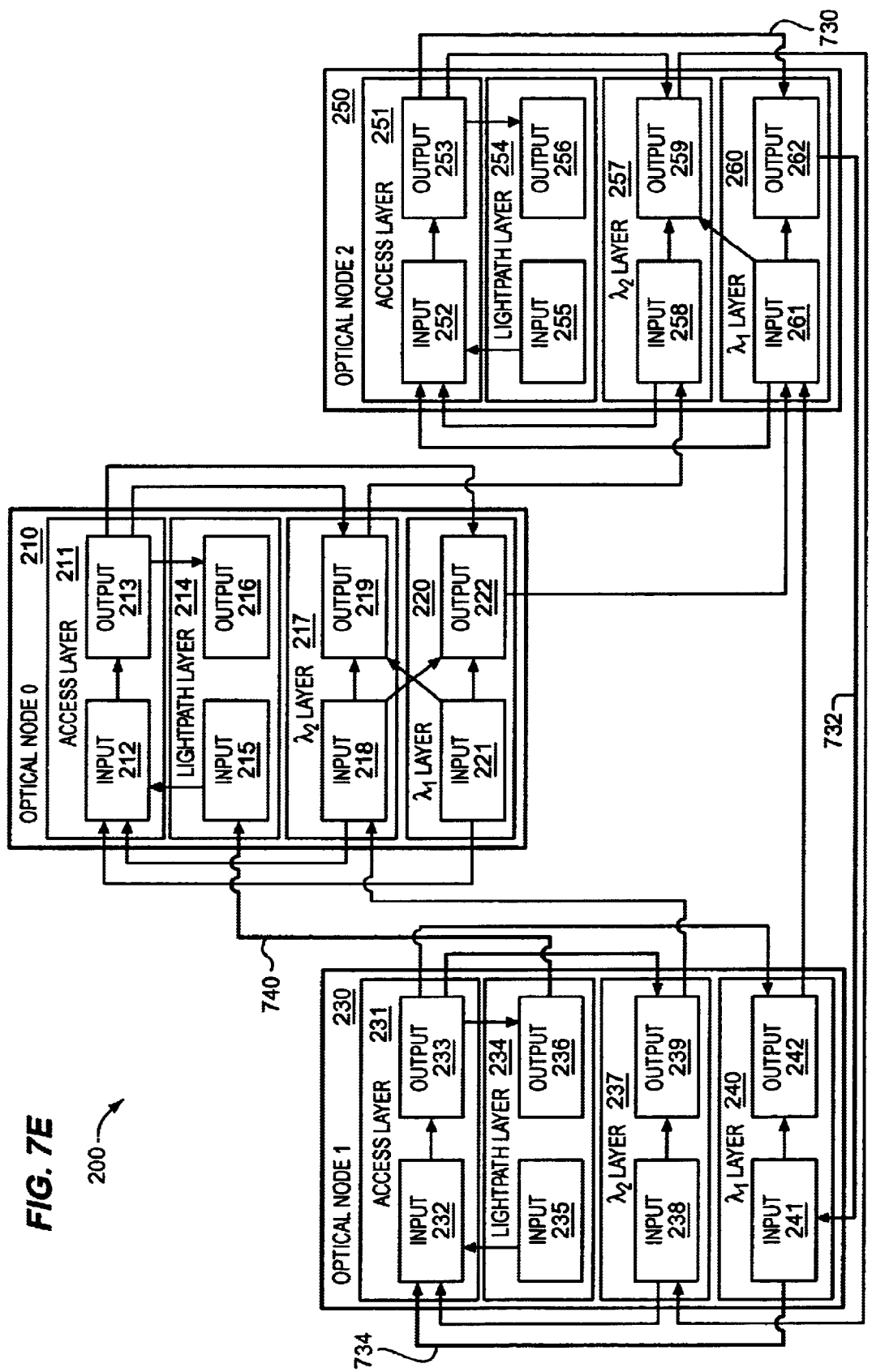
Figure 7F:
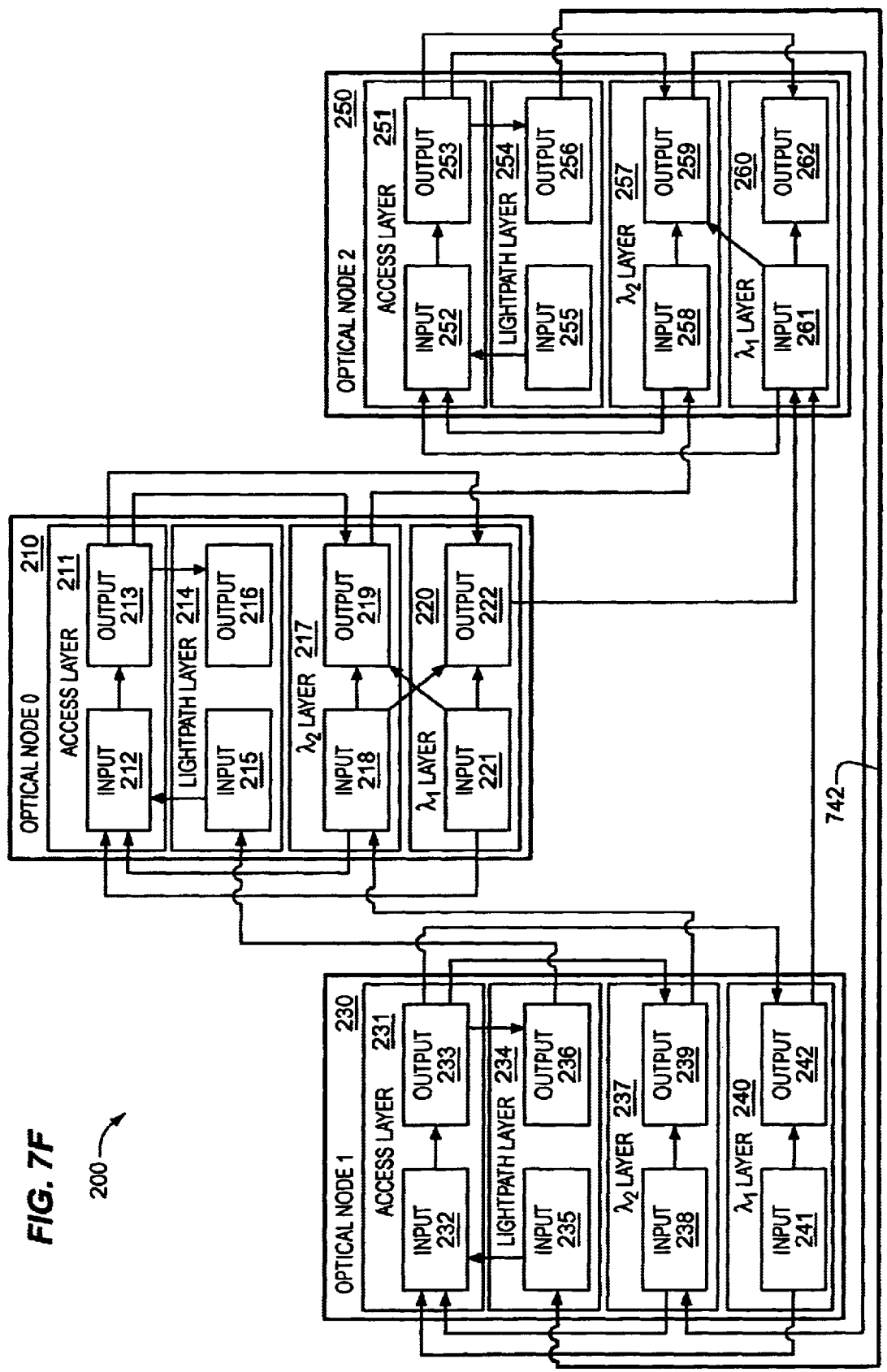

For a multi-hop grooming embodiment, one path is along the edges of TxE(2,1) 730, WLE(2,1,1) 732, RxE(1,1) 734, GrmE(1), MuxE(1), LPE(1,0) 740, and DmxE(0) as depicted in bold lines in FIG. 7E. This path contains edges WLE(2,1,1) 732 and LPE (1,0) 740, which denotes wavelength $\lambda_1$ on the fiber-links from node 2 250 to node 1 230 and the lightpath from node 1 230 to node 0 210 respectively. A lightpath $L_3$ is set up from node 2 250 to node 1 230 using wavelength $\lambda_1$ on the fiber-link from node 2 250 to node 1 230. Lightpath edge LPE(2,1) 742 is added and wavelength-link edge WLE(2,1,1) 732 is removed as depicted in FIG. 7F. The traffic $T_2$ is routed onto the newly setup lightpath $L_3$ and the pre-existing light $L_1$. The capacity of lightpath edge LPE (2,1) and LPE (1,0) are 36 and 12 units respectively. In this embodiment, the connection uses two lightpaths but only one more wavelength link is required for this traffic request. Since the connection traverses two lightpaths, this is called multi-hop grooming. One problem with multi-hop grooming is the added burden on electrical devices, which are the bottleneck and major cost in a WDM network at the intermediate nodes such as node 1 230 in the example above.

Grooming Policies and Weight Assignment

Grooming policies determines how to carry the traffic in a certain situation. These policies reflect the intentions of the network operator. Given a traffic demand T(s, d, g, m), how to route the traffic under the current network state needs to be determined. Four operations that can be used to carry the traffic without altering the existing lightpaths for a traffic demand T(s, d, g, m) in a network are explained below. Reconfirming existing lightpaths are not considered in these four embodiments because the traffic in the network would be interrupted.

Operation 1 routes the traffic onto an existing lightpath directly connecting the source node s and the destination node d. Operation 1 does not add new lightpaths and uses single-hop grooming. Operation 2 routes the traffic through multiple existing lightpaths. Operation 2 does not add new lightpaths and uses multi-hop grooming. Operation 3 sets up a new lightpath directly between the source node s and the destination node d and routes the traffic onto this lightpath. In this operation, only one lightpath is set up if the amount of the traffic is less than the capacity of the lightpath. Operation 3 does add new lightpaths and uses single-hop grooming.

Operation 4 sets up one or more lightpaths that do not directly connect the source node s and the destination node d and routes the traffic onto these lightpaths and/or some existing lightpaths. At least one lightpath needs to be set up. However, since some existing lightpaths may be utilized, the number of wavelength-links used to set up the new lightpaths is probably less than that of wavelength-links needed to set up a lightpath directly connecting the source node s and the destination node d.

Each operation may have to satisfy certain prerequisites before being applied. For example, operation 1 cannot be used if there is no lightpath between the source node and the destination node of the traffic that can accommodate the traffic. Different embodiments apply some or all of the operations. If none of the operations can be applied, the traffic is blocked without reconfiguring the existing lightpaths. The decisions of which operations to apply and what order to apply them reflects different grooming policies.

In each of the following three grooming policies, for a given traffic demand T(s, d, g, m,) if there is a lightpath from source node s to destination node d, this lightpath is chosen since this is the best solution for the connection request, i.e., operation 1 is used first. In Minimizing the Number of Traffic Hops (MinTH), if operation 1 fails, a lightpath from s to d is attempted to be set up and the traffic is routed onto this lightpath. If no such lightpath can be set up, multi-hop grooming is used. Thus, this policy uses operation 1 followed by operation 3. Then operations 2 and 4 will be used and chosen by the fewest hops.

Another grooming policy called Minimizing the Number of Lightpaths (MinLP) attempts to set up the minimum number of lightpaths to carry the traffic. If operation 1 fails, the traffic is attempted to be routed using multiple existing lightpaths as in operation 2. If operation 2 fails, operation 3 or operation 4 is used to attempt to set up one or more lightpaths to accommodate the traffic. Another grooming policy called Minimizing the Number of Wavelength-links (MinWL) attempts to consume the minimum number of unused wavelength-links to carry the traffic. After operations 1 and 2 fail, MinWL compares the number of wavelength-links used by operations 3 and 4 and chooses the one requiring fewer wavelength-links.

These three grooming policies can be achieved by applying different weight-assignment functions to the graph model and using the IGABAG algorithm. Since IGABAG chooses the shortest path found in the auxiliary graph, the order in which the four operations are combined is determined by the relationship of the weight of each edge. The weight of each kind of edge is represented by the name of the kind of edge. In this embodiment, the same kind of edges has the same weight and there is no wavelength converter at each node.

Operation 1 uses a single existing lightpath to route the traffic. Since each lightpath edge always has a mux and demux edge connected with it in the path, the weight of the path found in the auxiliary graph is:

$$MuxE+LPE+DmxE$$

Operation 2 uses n existing lightpaths to carry the traffic. Since each lightpath edge always has a mux and demux edge connected with it and there is a grooming edge between two lightpaths, the weight of the path found in the auxiliary graph is:

$$n \times (MuxE+LPE+DmxW)+(n-1) \times GrmE$$

Operation 3 sets up a lightpath between the source node and the designation node of the traffic and routes the traffic onto it. According to the IGABAG algorithm, the lightpath follows the path found in the graph, which consists of a transmitter edge, m wavelength-link edges, m—1 wavelength bypass edges, and a receiver edge. Therefore, the weight of the path found in the auxiliary graph is:

$$TxE+m \times WLE+(m-1) \times WBE+RxE$$

Operation 4 sets up k lightpaths and routes the traffic onto them and k' existing lightpaths. Each newly set up lightpath uses $1_i (1 \geq, 1 \leq i \leq k)$ wavelength-links. Thus, the weight of the path found in the auxiliary graph is:

$$\sum_{i=1}^{k}(TxE+l_i\times WLE+(l_i-1)\times WBE+RxE)+$$

$$k'\times(MuxE+LPE+DmxE)+(k+k'-1)\times GrmE$$

In some embodiments, the value of the weight of operation 1 is ensured to be the least among the four operations above to make operation 1 the first choice among the four operations.

Based on the analysis of the weight of each operation, the weights of the edges can be easily manipulated to satisfy the different grooming policies. The MinTH policy attempts to carry the current traffic request using the minimum number of lightpath hops on the virtual topology. For each traffic, there is a grooming edge following each hop on the virtual topology except the last one. At the same time, if a grooming edge is encountered in the path, the traffic experiences a hop on the virtual topology. Therefore, minimizing the traffic hops is equivalent to minimizing the number of grooming edges in the path found by IGABAG. A large weight is needed to be assigned to the grooming edges such that the weight of a path containing n grooming edges is always greater than that of any path containing n—1 grooming edges. These kind of edges are called dominant edges in the graph.

The MinLP policy attempts to set up the minimum number of new lightpaths for the current traffic request. For each newly set up lightpath, there is a transmitter edge and a receiver edge in the path according to which lightpath is set up. If there are n transmitter edges and receiver edges in the path, n lightpaths are set up according to IGABAG. Therefore, minimizing the number of lightpaths is equivalent to minimizing the number of transmitter edges and receiver edges, so the transmitter edges and the receiver edges should be the dominant edges in the graph. The MinWL policy attempts to use as few unused wavelength-links as possible to accommodate the current traffic request. This policy is achieved by making the wavelength-link edges the dominant edges.

For dynamic grooming, grooming policy should be changed based on the current network state which varies as connection requests come and go. For example, if transceivers are becoming rare resources, existing lightpaths should be fully used to accommodate the new traffic and avoid setting up new lightpaths. The graph model advantageously satisfies this requirement by adjusting the weights of edges according to the current network state.

Figure 8:
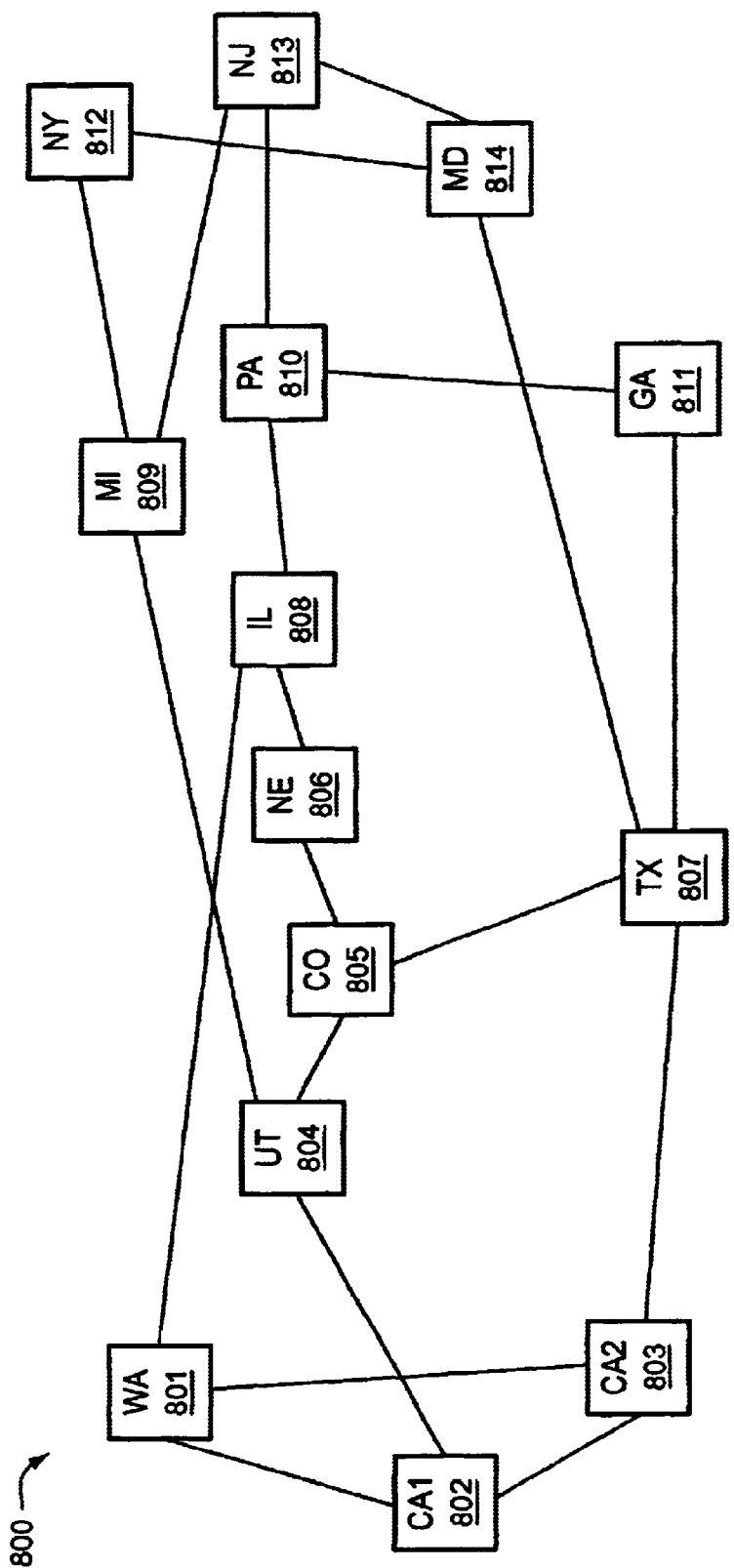
FIG. 8 is a block diagram of an optical communication network in an example of the invention.

FIGS. 3 and 7A–F depict one example of the optical communication network with three optical nodes. As stated above, the optical communication network can have numerous number of optical nodes. Also, the optical communication network may be in a mesh configuration as opposed to a ring configuration. FIG. 8 depicts a block diagram of an optical communication network 800 in an example of the invention. In this embodiment, the above-described functions and algorithms are applied to an optical communication network over the United States. In this embodiment, the optical nodes are placed in major cities in the United States.

A Washington node 801 is connected to a California 1 node 802, a California 2 node 803, and an Illinois node 808. The California 1 node 802 is connected to a Utah node 804 and the California 2 node 803. The California 2 node 803 is connected to a Texas node 807. The Utah node 804 is connected to a Colorado node 805 and a Michigan node 809. The Colorado node 805 is connected to a Nebraska node 806 and the Texas node 807. The Nebraska node 806 is connected to the Illinois node 808. The Texas node 807 is connected to a Georgia node 811 and a Maryland node 814. The Illinois node 808 is connected to a Pennsylvania node 810. The Michigan node 809 is connected to a New York node 812 and a New Jersey node 813. The Pennsylvania node 810 is connected to the New Jersey node 813. The New York node 812 is connected to the Maryland node 814. The New Jersey node 813 is connected to a Maryland node 814.

Figure 9:
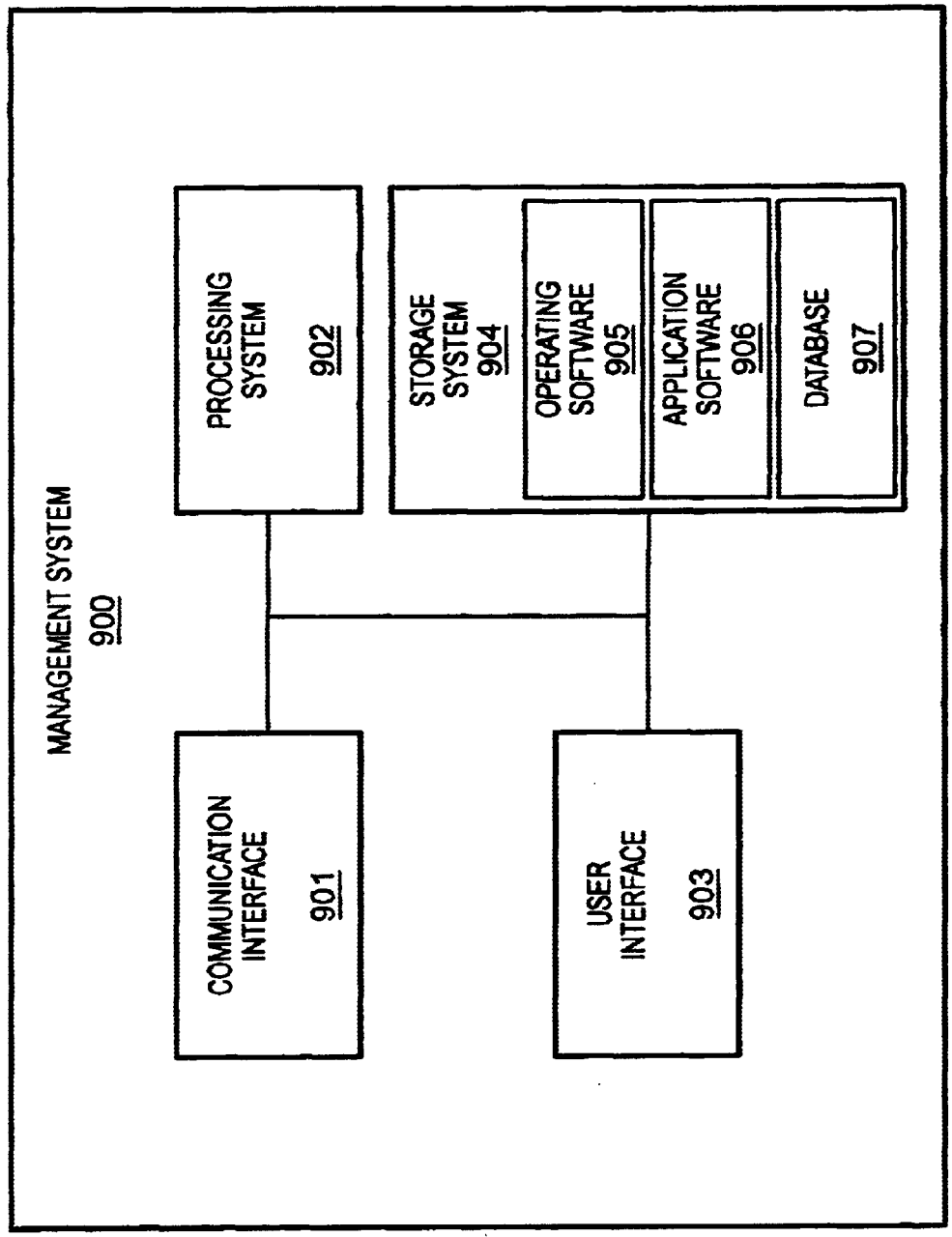
FIG. 9 is a block diagram of a management system in an example of the invention.

Management System—FIG. 9

In some embodiments, a management system performs the above-described functions such as generating the software model and routing and wavelength assignment to operate in accord with the invention. FIG. 9 depicts a block diagram of a management system 900 in an example of the invention. Management system 900 includes communication interface 901, processing system 902, user interface 903, and store system 904. Storage system 904 stores operating software 905, application software 906, and database 907. Processing system 902 is linked to communication interface 901, user interface 903, and storage system 904. Management system 900 cold be comprised of a programmed general-purpose computer, although those skilled in the art will appreciate that programmable or special purpose circuitry and equipment may be used. Management system 900 may use a client server architecture where operations are distributed among a server system and client devices that together comprise elements 901–906.

Communication interface 901 could comprise a network interface card, modem, port, or some other communication device. Communication interface 901 may be distributed among multiple communication devices. Processing system 902 could comprise a computer microprocessor, logic circuit, or some other processing device. Processing system 902 may be distributed among multiple processing devices. User interface 903 could comprise a keyboard, mouse, voice recognition interface, microphone and speakers, graphical display, touch screen, or some other type of user device. Storage system 904 could comprise a disk, tape, integrated circuit, server, or some other memory device. Storage system 904 may be distributed among multiple memory devices.

Processing system 902 retrieves and executes operating software 905 and application software 906 from storage system 904. Operating software 905 may comprise an operating system, utilities, drivers, networking software, and other software typically loaded onto a general-purpose computer. Application software 906 could comprise an application program, firmware, or some other form of machine-readable processing instructions. When executed by processing system 902, application software 906 directs processing system 902 to operate in accord with the invention as described above. Database 907 stores information related to the optical nodes such as links, partitions, and connections.

What is claimed is:

1. A method of operating an optical communication network with a plurality of optical nodes wherein the optical communication network uses wavelength division multiplexing, the method comprising:

generating a software model of the optical communication network wherein the optical nodes are represented by access layers with access input ports and access output ports, lightpath layers with lightpath input ports and lightpath output ports and wavelength layers for each wavelength with wavelength input ports and wavelength output ports;

generating graphical links between the access input ports, the access output ports, the lightpath input ports, the lightpath output ports, the wavelength input ports, and the wavelength output ports based on capabilities of the optical nodes;

determining a path for communications between a source one of the optical nodes and a destination one of the optical nodes wherein the path is between one of the access output ports of the source one to the one of the access input ports of the destination one through the lightpath layers and/or the wavelength layers based on the software model;

determining whether the path passes through any of the wavelength layers; and generating a lightpath link for the graphical links of the path that pass through the wavelength layers and assign the wavelength to the lightpath.

2. The method of claim 1 wherein the optical communication network is in a mesh configuration.

3. The method of claim 1 further comprising receiving a request for communications between a source one of the optical nodes and a destination one of the optical nodes.

4. The method of claim 1 wherein generating the graphical links further comprises generating a wavelength bypass edge between one of the wavelength input ports and one of the wavelength output ports for one of the optical nodes.

5. The method of claim 1 wherein generating the graphical links further comprises generating a grooming edge between one of the access input ports and one of the access output ports for one of the optical nodes based on grooming capabilities of the one of the optical nodes.

6. The method of claim 1 wherein generating the graphical links further comprises generating a mux edge between one of the access output ports and one of the lightpath output ports for one of the optical nodes.

7. The method of claim 1 wherein generating the graphical links further comprises generating a demux edge between one of the lightpath input ports and one of the access input ports for one of the optical nodes.

8. The method of claim 1 wherein generating the graphical links further comprises generating a transmitter edge between one of the access output ports and one of the wavelength output ports for one of the optical nodes based on availability of a transmitter at one of the optical nodes.

9. The method of claim 1 wherein generating the graphical links further comprising generating a receiver edge between one of the wavelength input ports one of sand one of the access input ports for one of the optical nodes based on availability of a receiver at one of the optical nodes.

10. The method of claim 1 wherein generating the graphical links further comprises generating a converter edge between one of the wavelength input ports for a first wavelength and one of the wavelength output ports for a second wavelength based on a capability to convert from the first wavelength to the second wavelength.

11. The method of claim 1 wherein generating the graphical links further comprises generating a wavelength edge between one of the wavelength output ports for a first one of the optical nodes and one of the wavelength input ports for a second one of the optical nodes.

12. The method of claim 1 wherein generating the graphical links further comprises generating a lightpath edge between one of the lightpath output ports for a first one of the optical nodes and one of the lightpath input ports for a second one of the optical nodes.

13. The method of claim 1 further comprising assigning weight to the graphical links.

14. The method of claim 1 further comprising deleting graphical links based on the capabilities of the optical nodes.

15. The method of claim 1 further comprising updating capacities of the graphical links.

16. The method of claim 1 further comprising receiving a plurality of requests for communications.

17. The method of claim 16 further comprising determining an order to process the plurality of requests for communications.

18. The method of claim 17 wherein determining the order is based on costs of the requests for communications.

19. The method of claim 17 wherein determining the order is based on utilizations of the requests for communications.

20. A software product for operating an optical communication network with a plurality of optical nodes wherein the optical communication network uses wavelength division multiplexing, the software product comprising:

application software operational when executed by a processor to direct the processor to generate a software model of the optical communication network wherein the optical nodes are represented by access layers with access input ports and access output ports, lightpath layers with lightpath input ports and light output ports and wavelength layers for each wavelength with wavelength input ports and wavelength output ports, generate graphical links between the access input ports, the access output ports, the lightpath input ports, the lightpath output ports, the wavelength input ports, and the wavelength output ports based on capabilities of the optical nodes, determine a path for communications between a source one of the optical nodes and a destination one of the optical nodes wherein the path is between one of the access output ports of the source one to the one of the access input ports of the destination one through the lightpath layers and/or the wavelength layers based on the software model, determine whether the path passes through any of the wavelength layers, and generate a lightpath link for the graphical links of the path that pass through the wavelength layers and assign the wavelength to the lightpath; and a software storage medium operational to store the application software.

21. The software product of claim 20 wherein the optical communication network is in a mesh configuration.

22. The software product of claim 20 wherein the application software is operational when executed by the processor to direct the processor to receive a request for communications between a source one of the optical nodes and a destination one of the optical nodes.

23. The software product of claim 20 wherein the application software is operational when executed by the processor to direct the processor to generate a wavelength bypass edge between one of the wavelength input ports and one of the wavelength output ports for one of the optical nodes.

24. The software product of claim 20 wherein the application software is operational when executed by the processor to direct the processor to generate a grooming edge between one of the access input ports and one of the access output ports for one of the optical nodes based on grooming capabilities of the one of the optical nodes.

25. The software product of claim 20 wherein the application software is operational when executed by the processor to direct the processor to generate a mux edge between one of the access output ports and one of the lightpath output ports for one of the optical nodes.

26. The software product of claim 20 wherein the application software is operational when executed by the processor to direct the processor to generate a demux edge between one of the lightpath input ports and one of the access input ports for one of the optical nodes.

27. The software product of claim 20 wherein the application software is operational when executed by the processor to direct the processor to generate a transmitter edge between one of the access output ports and one of the wavelength output ports for one of the optical nodes based on availability of a transmitter at one of the optical nodes.

28. The software product of claim 20 wherein the application software is operational when executed by the processor to direct the processor to generate a receiver edge between one of the wavelength input ports one of the access input ports and one of the access input ports for one of the optical nodes based on availability of a receiver at one of the optical nodes.

29. The software product of claim 20 wherein the application software is operational when executed by the processor to direct the processor to generate a converter edge between one of the wavelength input ports for a first wavelength and one of the wavelength output ports for a second wavelength based on a capability to convert from the first wavelength to the second wavelength.

30. The software product of claim 20 wherein the application software is operational when executed by the processor to direct the processor to generate a wavelength edge between one of the wavelength output ports for a first one of the optical nodes and one of the wavelength input ports for a second one of the optical nodes.

31. The software product of claim 20 wherein the application software is operational when executed by the processor to direct the processor to generate a lightpath edge between one of the lightpath output ports for a first one of the optical nodes and one of the lightpath input ports for a second one of the optical nodes.

32. The software product of claim 20 wherein the application software is operational when executed by the processor to direct the processor to assign weight to the graphical links.

33. The software product of claim 20 wherein the application software is operational when executed by the processor to direct the processor to delete graphical links based on the capabilities of the optical nodes.

34. The software product of claim 20 wherein the application software is operational when executed by the processor to the update capacities of the graphical links.

35. The software product of claim 20 wherein the application software is operational when executed by the processor to direct the processor to receive a plurality of requests for communications.

36. The software product of claim 35 wherein the application software is operational when executed by the processor to direct the processor to determining an order to process the plurality of requests for communications.

37. The software product of claim 36 wherein the application software is operational when executed by the processor to direct the processor to determine order based on costs of the requests for communications.

38. The software product of claim 36 wherein the application software is operational when executed by the processor to direct the processor to determine the order based on utilizations of the requests for communications.

39. A system for operating an optical communication network with a plurality of optical nodes wherein the optical communication network uses wavelength division multiplexing, the system comprising:

a processing system configured to generate a software model of the optical communication network wherein the optical nodes are represented by access layers with access input ports and access output ports, lightpath layers with lightpath input ports and lightpath output ports and wavelength layers for each wavelength with wavelength input ports and wavelength output ports, generate graphical links between the access input ports, the access output ports, the lightpath input ports, the lightpath output ports, the wavelength input ports, and the wavelength output ports based on capabilities of the optical nodes, determine a path for communications between a source one of the optical nodes and a destination one of the optical nodes wherein the path is between one of the access output ports of the source one to the one of the access input ports of the destination one through the lightpath layers and/or the wavelength layers based on the software model, determine whether the path passes through any of the wavelength, layers, and generate a lightpath link for the graphical links of the path that pass though the wavelength layers and assign the wavelength to the lightpath; and an interface connected to the processing system and configured to receive a request for communications between a source one of the optical nodes and a destination one of the optical nodes.

40. The system of claim 39 wherein the optical communication network is in a mesh configuration.

41. The system of claim 39 wherein the processing system is configured to generate a wavelength bypass edge between one of the wavelength input ports and one of the wavelength output ports for one of the optical nodes.

42. The system of claim 39 wherein the processing system is configured to generate a grooming edge between one of the access input ports and one of the access output ports for one of the optical nodes based on grooming capabilities of the one of the optical nodes.

43. The system of claim 39 wherein the processing system is configured to generate a mux edge between one of the access output ports and one of the lightpath output ports for one of the optical nodes.

44. The system of claim 39 wherein the processing system is configured to generate a demux edge between one of the access input ports and one of the lightpath input ports for one of the optical nodes.

45. The system of claim 39 wherein the processing system is configured to generate a transmitter edge between one of the access output ports and one of the wavelength output ports for one of the optical nodes based on availability of a transmitter at one of the optical nodes.

46. The system of claim 39 wherein the processing system is configured to generate a receiver edge between one of the wavelength input ports one of the input ports and one of the access input port for one of the optical nodes based on availability of a receiver at one of the optical nodes.

47. The system of claim 39 wherein the processing system is configured to generate a converter edge between one of the wavelength input ports for a first wavelength and one of the wavelength output ports for a second wavelength based on a capability to convert from the first wavelength to the second wavelength.

48. The system of claim 39 wherein the processing system is configured to generate a wavelength edge between one of the wavelength output ports for a first one of the optical nodes and one of the wavelength input ports for a second one of the optical nodes.

49. The system of claim 39 wherein the processing system is configured to generate a lightpath edge between one of the lightpath output ports for a first one of the optical nodes and one of the lightpath input ports for a second one of the optical nodes.

50. The system of claim 39 wherein the processing system is configured to assign weight to the graphical links.

51. The system of claim 39 wherein the processing system is configured to delete graphical links based on the capabilities of the optical nodes.

52. The system of claim 39 wherein the processing system is configured to update capacities of the graphical links.

53. The system of claim 39 wherein the interface is configured to receive a plurality of requests for communications.

54. The system of claim 53 wherein the processing system is configured to determine an order to process the plurality of requests for communications.

55. The system of claim 54 wherein the processing system is configured to determine the order based on costs of the requests for communications.

56. The system of claim 54 wherein the processing system is configured to determine the order based on utilizations of the requests for communications.

* * * * *